(12) United States Patent
Miller

(10) Patent No.: US 9,819,804 B2
(45) Date of Patent: Nov. 14, 2017

(54) PORTABLE VOICE COMMUNICATIONS DIGITAL SWITCHING DEVICE FOR COMMUNICATIONS SYSTEMS

(71) Applicant: TELEGENIX, INC., Rancocas, NJ (US)

(72) Inventor: Joseph John Miller, Mount Laurel, NJ (US)

(73) Assignee: TELEGENIX, INC., Rancocas, NJ (US)

(*) Notice: Subject to any disclaimer, the term of this patent is extended or adjusted under 35 U.S.C. 154(b) by 140 days.

(21) Appl. No.: 14/991,315

(22) Filed: Jan. 8, 2016

(65) Prior Publication Data

US 2016/0205258 A1    Jul. 14, 2016

Related U.S. Application Data

(60) Provisional application No. 62/101,159, filed on Jan. 8, 2015.

(51) Int. Cl.
*H04M 3/00*    (2006.01)
*H04M 5/00*    (2006.01)
*H04M 5/02*    (2006.01)
*H04Q 11/04*   (2006.01)

(52) U.S. Cl.
CPC .......... *H04M 5/02* (2013.01); *H04Q 11/0407* (2013.01)

(58) Field of Classification Search
CPC ............. H04M 5/02; H04M 5/00; H04M 5/08
USPC ........................................ 379/321, 320, 242
See application file for complete search history.

(56) References Cited

U.S. PATENT DOCUMENTS

| 5,761,320 | A | 6/1998 | Farinelli et al. |
| 7,242,752 | B2 | 7/2007 | Chiu |
| 9,710,148 | B2* | 7/2017 | Lee .................. G06F 3/0488 |
| 2006/0045077 | A1 | 3/2006 | Mallya |
| 2007/0183402 | A1 | 8/2007 | Bennett et al. |
| 2012/0218196 | A1* | 8/2012 | Lv .................... G06F 3/0416 345/173 |

FOREIGN PATENT DOCUMENTS

| JP | 2007-527640 A | 9/2007 |
| WO | 00/07345 A1 | 2/2000 |

OTHER PUBLICATIONS

Telegenix, Inc., PROCOM 2000 Series, Voice Communication Switching System, Jan. 2014, Rancocas, New Jersey.
Telegenix, Inc., PROCOM 2000 Series Communications Control Unit (CCU), PIB 01-0301, Feb. 2003, Cherry Hill, New Jersey.
Telegenix, Inc., PROCOM 2000 Series Communications Control Unit (CCU), PIB 01-0302, Feb. 2003, Cherry Hill, New Jersey.
Telegenix, Inc., PROCOM Series OpS (Operator Station), PIB 01-0412, Mar. 2006, Cherry Hill, New Jersey.

* cited by examiner

*Primary Examiner* — Thjuan K Addy
(74) *Attorney, Agent, or Firm* — Philip O. Post

(57) ABSTRACT

A portable voice communication digital switching device is provided for use with voice communication systems. The switching device is contained in a portable switching device enclosure and has a central control unit that includes communication line interface units and an operator position station with a touch display screen for operator switching control of communication components connected to the switching device.

19 Claims, 16 Drawing Sheets

FIG. 2

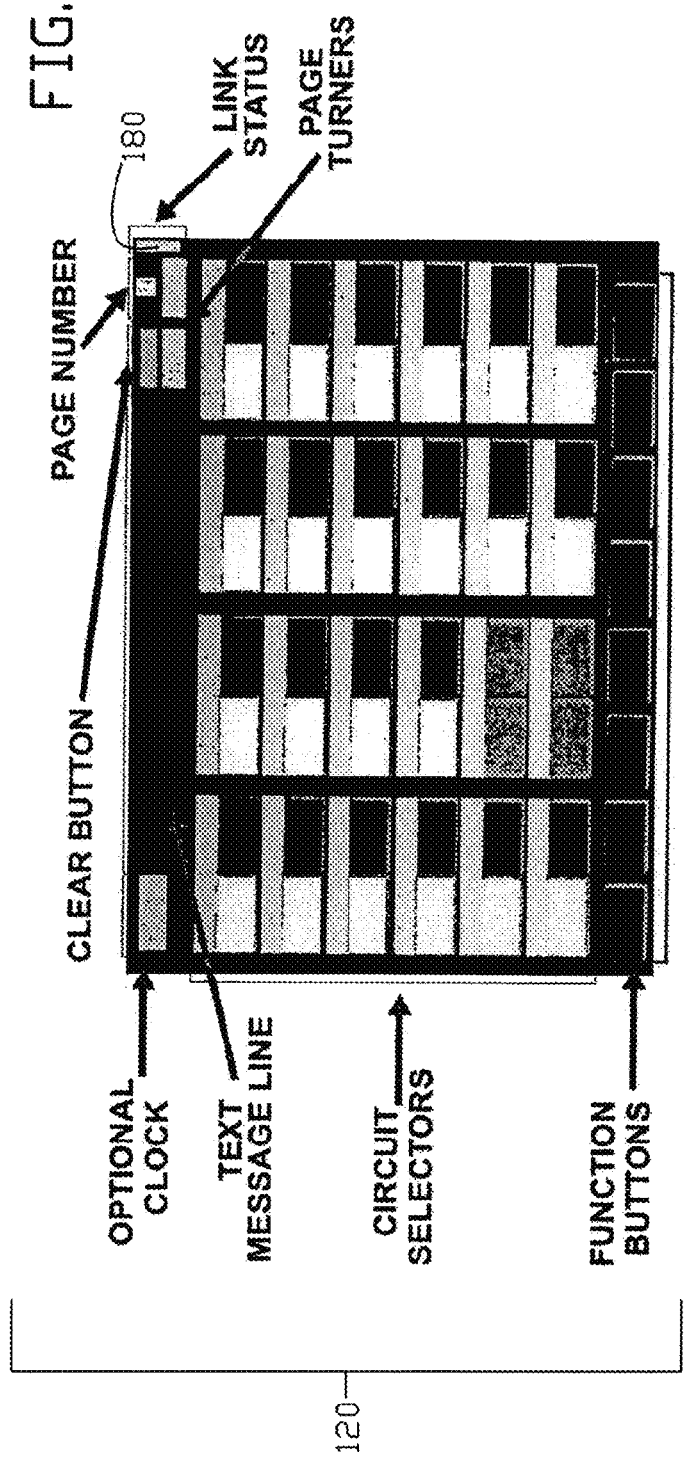
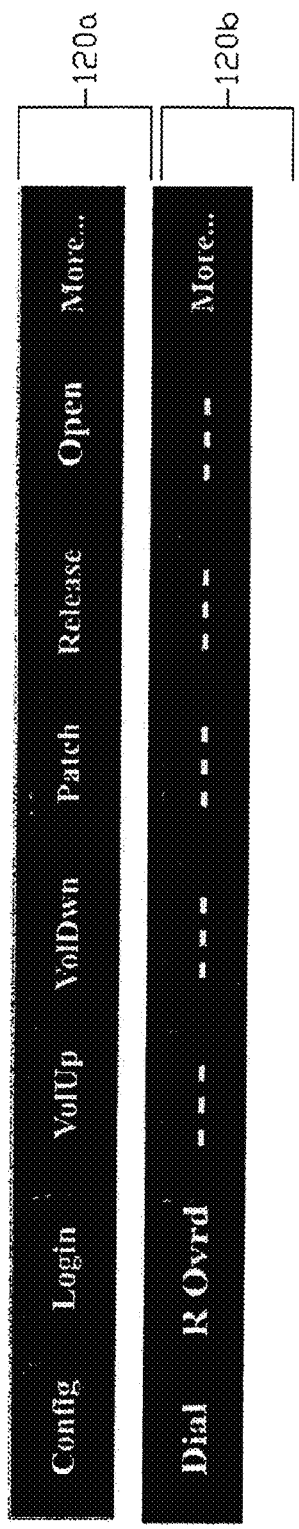

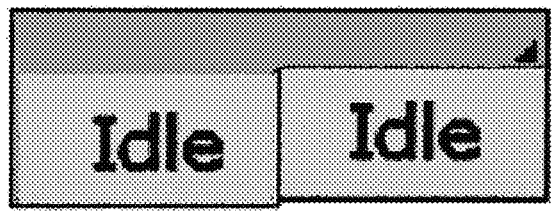
FIG. 12
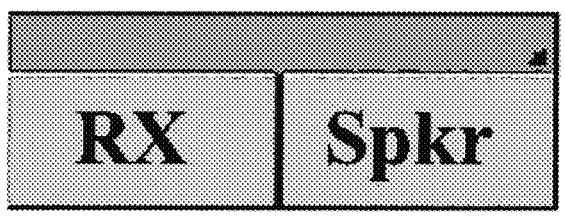
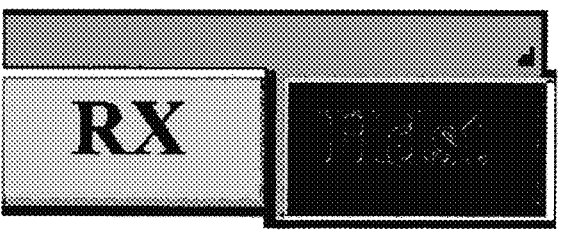
FIG. 13

FIG. 20

PORTABLE VOICE COMMUNICATIONS DIGITAL SWITCHING DEVICE FOR COMMUNICATIONS SYSTEMS

CROSS REFERENCE TO RELATED APPLICATIONS

This application claims the benefit of U.S. Provisional Application No. 62/101,159 filed Jan. 8, 2015, which is hereby incorporated by reference in its entirety.

FIELD OF THE INVENTION

The present invention relates generally to voice communications systems and specifically to a programmable voice communications digital switching device in a portable enclosure for integrating various voice communications systems such as intercom, interphone and radio communications in voice communications systems.

BACKGROUND OF THE INVENTION

In a prior art embodiment, voice communications systems utilize a plurality of equipment rack mounted line interface unit circuit cards that interfaced with voice input/output (I/O) devices such as headsets and radios in a voice communications system. Control of the line interface unit circuit cards is accomplished by connection to a controller circuit card mounted in an equipment rack, which in turn, is connected to an external computer that an operator of the voice communications switching system uses for control of the line interface unit circuit cards. A separate equipment rack mounted power supply card is used to supply power as required for the rack mounted line interface unit circuit cards and the rack mounted controller circuit card.

It is one object of the present invention to provide a portable communications system switching signal processing circuitry, switching system output display to a switching system operator and switching system input from the switching system operator in a portable and programmable switching device for use in voice communications systems, for example, in mobile field applications.

It is another object of the present invention to provide a method for a voice communications switching system operator input where the switching signal processing circuitry, switching system output display to the switching system operator and the switching system input from the operator is performed in a portable and programmable voice communications switching device, for example, in mobile field applications.

BRIEF SUMMARY OF THE INVENTION

In one aspect the present invention is a portable voice communications digital switching device in a portable switching device enclosure housing a touch display screen and a central control unit having a node controller and a plurality of line interface unit cards for the control of a plurality of voice communication circuits connected to the portable voice communications digital switching device.

In another aspect the present invention is a method of displaying on a touch display screen in a portable voice communications digital switching device for voice communications systems where a main operations display page is displayed on the touch display screen on start-up of the portable voice communications digital switching device, and a dynamically changing main operations display page, a dial display page, a logon display page or a configuration display page is selectively displayed on the touch display screen by execution of the switching device operating software responsive to the plurality of voice communications circuits connected to the plurality of line interface units and the operator input to the touch display screen.

The above and other aspects of the disclosed invention are set forth in this specification and the appended claims.

BRIEF DESCRIPTION OF THE DRAWINGS

The figures, in conjunction with the specification, illustrate one or more non-limiting modes of practicing the disclosed invention. The invention is not limited to the illustrated layout and content of the drawings.

FIG. 2 is one example of a typical main operations display page that can be displayed on a touch display screen in the portable voice communications digital switching device shown in FIG. 1.

FIG. 6(a) is one example of a main operations display page that can be displayed on a touch display screen of a portable voice communications digital switching device of the present invention.

FIG. 6(b) is one example of alternative rows of function buttons that can be displayed in the main operations display page shown in FIG. 6(a).

FIG. 12 is one example of an idle circuit selector display that can be displayed on the main operations display page shown in FIG. 6(a).

FIG. 13 illustrates steps performed by an operator of a portable voice communications digital switching device of the present invention to select a radio circuit for monitoring.

FIG. 20 is another example of a main operations display page of the present invention with a screen print message in the text message line.

DETAILED DESCRIPTION OF THE INVENTION

Figure 1:
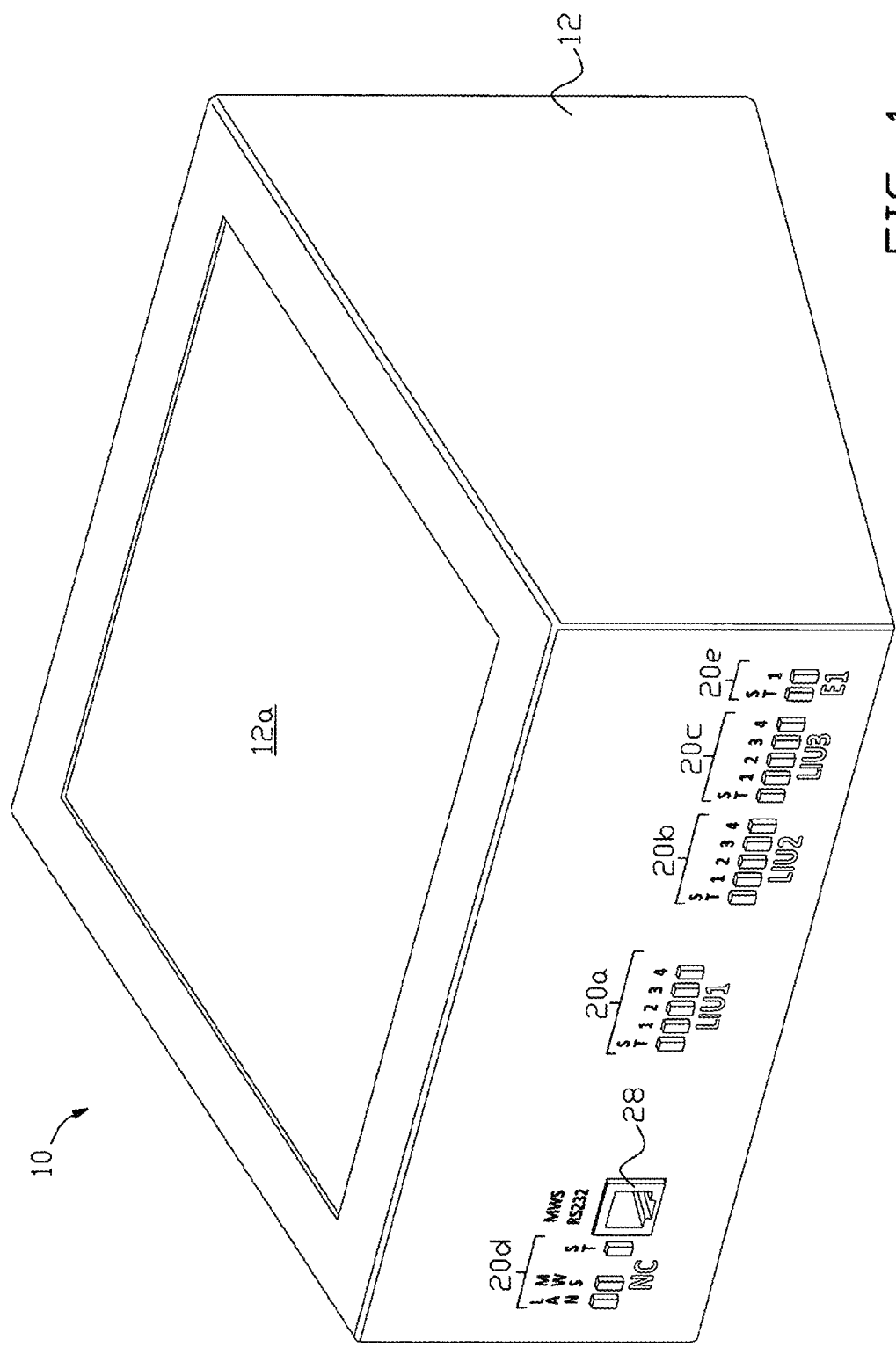
FIG. 1 is a perspective view of one example of a portable voice communications digital switching device of the present invention for voice communications systems.
Figure 3:
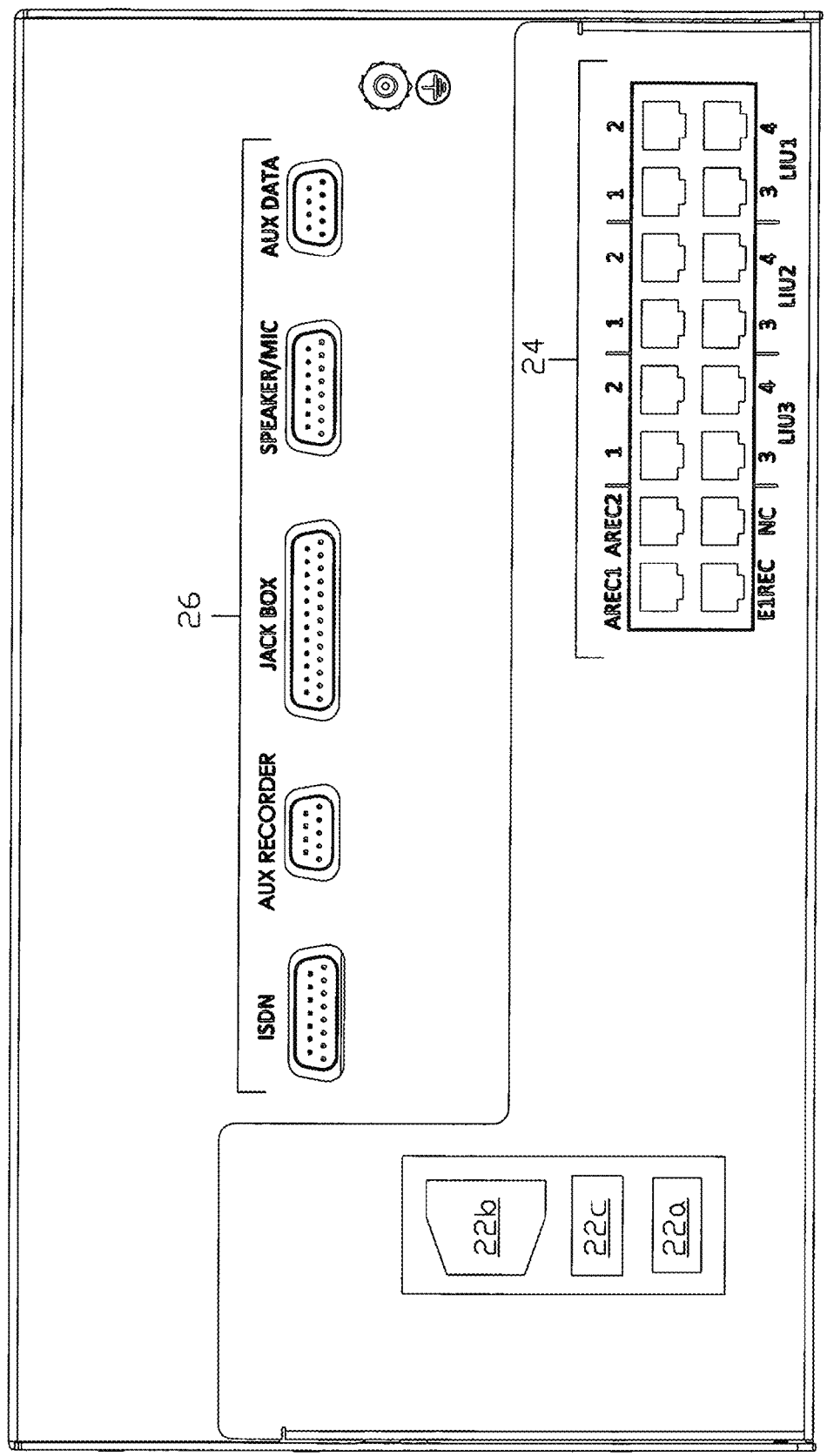
FIG. 3 is a rear elevational view of one example of a portable voice communications digital switching device of the present invention.

One embodiment of a portable voice communications digital switching device 10 (also referred to as a portable voice communications switching device 10 or the switching device) of the present invention is shown in FIG. 1 and FIG. 3. Portable switching device enclosure 12 contains touch display screen 12a for use by a voice communications switching operator at a device operator position station (OPS) (also referred to as the operator's station) and internal central control unit (CCU) 12b (FIG. 5) within portable switching device enclosure 12 to form a complete stand-alone and portable voice communications switching device and voice communications control system with externally connected communications system I/O components as shown, for example, in FIG. 4 that comprises a voice communications system in a typical application of a portable voice communications switching device of the present invention.

Preferably touch display screen 12a is a color display screen of suitable design, such as, but not limited to a backlit liquid crystal display (LCD) where a multi-color display scheme is used as a means to differentiate between status of the displayed information.

In an embodiment of the invention, portable switching device enclosure 12 comprises a portable rectangularly-shaped enclosure with touch display screen 12a facing outward on a sloped top face of the enclosure. The portable switching device enclosure also contains voice I/O connectors 26 for connection with one or more I/O communication system components, for example, I/O headset 14 and 14a/handset/foot switch (via jack box 92 in this embodiment of the invention) as shown in FIG. 4, speaker/microphone, integrated services for digital network (ISDN) cable, and voice recorder all of which can be referred to collectively as system audio or voice devices.

Figure 4:
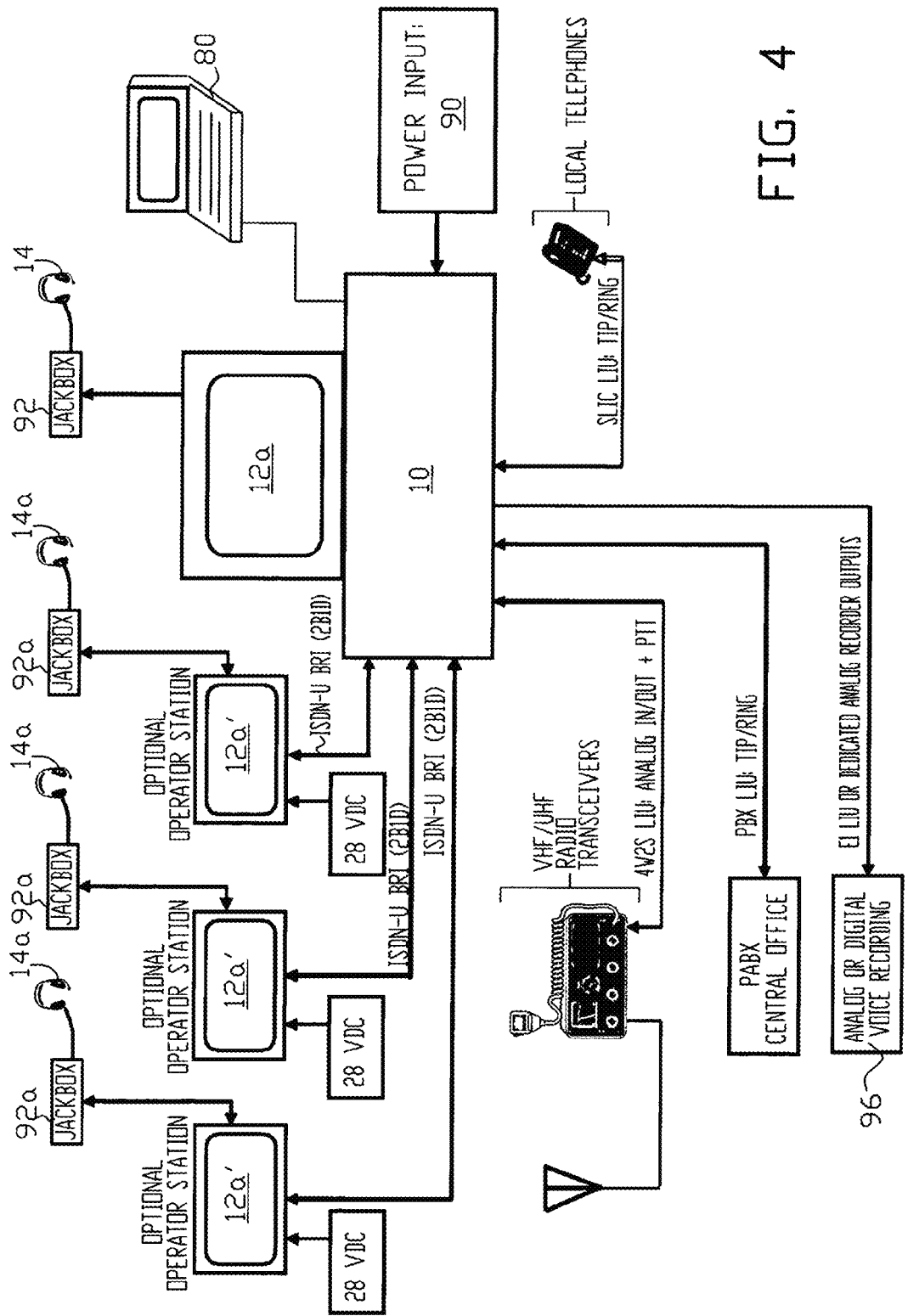
FIG. 4 is a block diagram of typical voice communication system components that can be switched and controlled with a portable voice communications digital switching device of the present invention.
Figure 5:
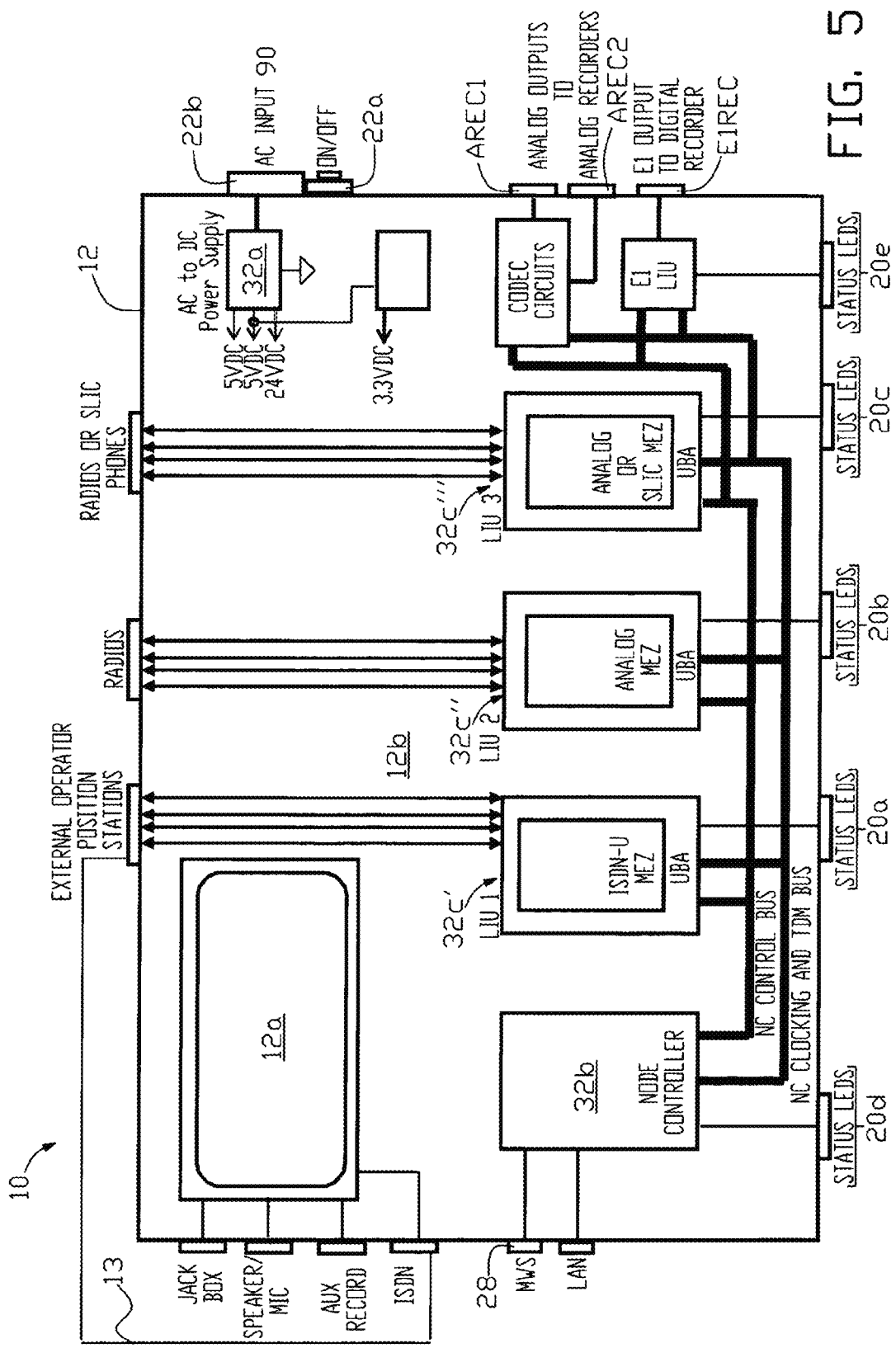
FIG. 5 is an internal block diagram of one example of a portable voice communications digital switching device of the present invention.

In an embodiment of the invention shown in the drawings, power is supplied to the portable voice communications switching device 10 from an electric power source 90 with suitable power characteristics as shown in FIG. 4 and FIG. 5. External power supply interface components: power on/off switch 22a; power cable connector receptacle 22b and power fuse/holder 22c are located at the lower left corner on the rear of portable voice communications switching device 10 as shown in FIG. 3. In alternative embodiments of the invention, the power source can be internal to portable switching device enclosure 12, for example, as a battery power source.

In an embodiment of the invention shown in the drawings, maintenance software and host computer (MWS) 80 can be provided as an external I/O component to the portable voice communications switching device 10 as shown in FIG. 4 to provide a means for installing and/or modifying switching device operating software that can execute all of the portable voice communications switching device's functions disclosed herein independent of software or hardware external to the switching device. The software code and algorithms contained in the switching device operating software executes an operator's screen touch inputs via touch display screen 12a.

As further described herein, the portable voice communications switching device 10 provides a means for establishing voice communications links over telephone lines and radios (such as UHF and/or VHF radios), as well as over a local network using intercom and interphone circuits. A switching device operator may be at the local operator position station at the switching device or remote at one or more remote operator position stations suitably connected to the switching device as further described herein.

A local operator of portable voice communications switching device 10 monitors data or transmits data over multiple voice communications circuits simultaneously by interfacing with touch display screen 12a as further disclosed herein. A remote operator of the switching device monitors data or transmits data over multiple voice communications circuits simultaneously by interfacing with a touch display screen 12a' at the remote optional operator position station as shown in FIG. 4.

Communication can be established by an operator of the switching device by using a headset 14 and 14a (and/or handset including a microphone and an ear piece). The communication paths can be set up from the switching device by pressing (also referred to as touch selecting) circuit selector buttons on touch display screen 12a (or an optional remote touch display screen 12a' if used) to cause an action and observing indicators on the touch display screen for verification of the action as further disclosed herein. As further described herein the node controller 32b in central control unit 12b (FIG. 5) executes algorithms in the switching device operating software to prevent communication links from interfering with each other.

Optional visual indicators can be provided on the switching device, for example, as light emitting diode (LED) arrays 20a, 20b, 20c, 20d and 20e on the front of portable switching device enclosure 12 to indicate functional status of components within the switching device.

In an embodiment of the invention shown in the drawings, suitable connectors 24 (for example RJ-45 connectors) are provided for I/O external voice communications connections to central control unit 12b (FIG. 5) at the lower right hand corner on the rear of portable voice communications switching device 10 as shown in FIG. 3.

In an embodiment of the invention shown in the drawings, suitable connectors 26 (for example RS-232 connectors) are provided for external outputs to, for example, an optional remote operator position station (if used) at the upper right corner on the rear of portable voice communications switching device 10 as shown in FIG. 3.

In the embodiment of the invention shown in FIG. 1, a suitable connector 28 (for example RJ-45 connector) can be provided on the front of switching device 10 for an external interface to maintenance software and host computer 80, which can be, for example, a laptop computer or computer workstation.

Touch display screen 12a located in portable voice communications switching device 10 functions as the command center of the complete stand-alone and portable communications switching device. In this example of the invention touch display screen 12a is suitably connected to internal central control unit 12b, for example, by using an external 2-wire ISDN-U interface 13 in FIG. 5. Alternatively in other embodiments of the invention, a connection internal to portable switching device enclosure 12 can be made between the touch display screen and the central control unit.

In an embodiment of the invention shown in FIG. 5 central control unit 12b comprises internal power conditioner 32a for the externally supplied power source 90, a node controller (NC) 32b, and at least one line interface unit (LIU) as shown in FIG. 5 where in this embodiment of the invention there are three line interface units 32c', 32c'' and 32c'''. Maintenance software and host computer 80 can be used to load switching device operating software via connector 28 (MWS) in FIG. 1 and FIG. 5 to node controller 32b in the central control unit. Node controller (NC) 32b can distribute operating software to other components in the central control unit and control operation of other components in the central control unit via the NC CONTROL BUS and NC CLOCKING AND TDM (time-division multiplexing) BUS shown in FIG. 5.

In the embodiment of the invention shown in FIG. 4, jack boxes 92 and 92a are used as an I/O device interface connection (external to the switching device) to headsets 14 and 14a (also to optional speakers and footswitches not shown in the figure). Optionally one or more stand-alone external touch display screens 12a' and analog and/or digital voice recorder 96 can be provided as an external interface to the switching device to form the complete stand-alone and portable communications control system as shown in FIG. 4. Each optional external touch display screen 12a' in FIG. 4 comprises a component at an external operator position station for portable voice communications switching device 10. In some embodiments of the invention, an uninterruptible power supply (UPS) is provided external or internal to portable switching device enclosure 12 to avoid loss of communication call status within the stand-alone and portable communications control system and reloading of the switching device operating software during temporary loss of externally supplied power to the switching device.

In the embodiment of the invention shown in FIG. 3 and FIG. 5, connectors 24 for I/O external central control unit 12b provide the following connection capabilities:

two dedicated analog recorder output ports indentified as AREC1 and AREC2;

one 10 Base T Ethernet port (identified as connector NC in FIG. 3 and connector LAN in FIG. 5) or other suitable digital network protocol;

twelve general-purpose line interface unit (LIU) ports (LIU1, LIU2 and LIU3 in FIG. 3 and EXTERNAL OPERATOR POSITION STATIONS, RADIOS and RADIOS OR SLIC (subscriber line interface circuits) PHONES in FIG. 5) comprising three line interface units' groups of four ports each (designated LIU1-1 to 4; LIU2-1 to 4; and LIU3-1 to 4 in FIG. 3); and one dedicated digital recorder output port identified as E1REC.

The line interface units' ports numbering corresponds to the front panel visual status indicator groups 20a, 20b and 20c.

In the embodiment of the invention shown in the figures, all external voice communications devices plug into connectors on the rear panel of the switching device and there are provisions for four specific communication device interfaces for each rear panel port. The actual number of ports depends on the line interface unit types used in a particular embodiment of the present invention.

Referring to FIG. 5, in one embodiment of the invention, each line interface unit comprises a universal bus adapter (UBA) assembly (circuit board) and an interface specific mezzanine (MEZ) board that can support conventional voice communications interface types. Each universal bus adapter assembly mounts a voice communication tool specific mezzanine board. Once a specific mezzanine board is attached to a line interface unit that line interface unit will only work for the corresponding voice communication tool. Each line interface board can be preconfigured with a specific mezzanine board. Table 1 below illustrates typical available line interface unit boards; the corresponding voice communication tool; and how many ports that interface unit will have in one embodiment of the present invention. All four ports for a line interface unit are identical in this embodiment of the invention.

TABLE 1

| MEZZANINE BOARD | DEVICE CONNECTED TO | PORTS |
| --- | --- | --- |
| ISDN-U BRI (2B1D) Digital 2 Wire Lines | External operator position station | 4 |
| ISDN-E1 PRI Trunk | PSK node or PBX/CO | 1 |
| SLIC Interface | POTS | 4 |
| 4 Wire Analog Interface | Radios, Recorders, PA Systems, Voice Lines | 4 |

The universal bus adaptor assembly performs the common function of interfacing the data buses to the unique line interface and performs audio and control processing. A line interface unit's mezzanine board attaches to the universal bus adaptor assembly and provides the physical layer interface to the external transmission facilities of the switched communication systems. The mezzanine board's interface is initialized and controlled via a universal bus adaptor processor on the universal bus adaptor assembly, which in this embodiment of the invention, can determine the mezzanine board type by querying a register on the mezzanine board.

Upper layer data link and network protocols (line supervision and register signaling) are also implemented in the universal bus adaptor processor.

The rear connector panel upper row of connectors 26 (FIG. 3) interfaces the switching device's touch display screen 12a with optional external system components and the jack box standard component (identified as JACK BOX connector in FIG. 3) in the embodiment of the invention shown in the figures. The optional external system components can comprise one or more of the following:

one or more external operator position stations (identified as ISDN connector in FIG. 3) with an external operator's touch display screen 12a';

auxiliary data (identified as AUX DATA connector in FIG. 3);

auxiliary recorder (identified as AUX RECORDER connector in FIG. 3); and speaker/microphone (identified as SPEAKER/MIC connector in FIG. 3).

In the embodiment of the invention shown in FIG. 1, front RS-232 (MWS) connector 28 is used to connect external maintenance software and host computer 80 to switching device 10 as shown in FIG. 4. In some embodiments of the invention, the external maintenance software and host computer can be used to:

view circuit status and device status connected to the switching device;

review an error log and equipment status connected to the switching device; and access diagnostic and equipment control utilities associated with the switching device.

An external jack box 92 or 92a is a standard component to be an access point for an operator's audio connections to the switching device in the embodiment of the invention shown in the drawings. External jack box 92 or 92a can be used to connect two headsets or handsets (in applications where there are more than one operator of switching device 10); push-to-talk or push-to-transmit (PTT) switches; and a foot switch (that functions as a PTT switch) to the switching device.

Headsets 14 and 14a are audio input and output devices used by an operator of the switching device and in the embodiment of the invention shown in the drawings are plugged into the front of an external jack box. In other examples of the invention, the headset may be connected directly to the switching device.

In the embodiment of the invention shown in the drawings, a separate jack box 92 is provided external to the switching device for local operator audio input and voice output apparatus such as headset 14 or handset with a PTT device such as a hand or foot switch.

The switching device allows either of the two headsets/handset(s) to be used for all communications features. All incoming audio selected to go to headset/handset(s) is routed to both headset/handset(s). When microphones are hot (that is, there is no need to key during a telephone call) audio for each microphone is heard in the other headset/handset. During radio transmission however, only one microphone will be hot (transmitting).

The switching device incorporates dedicated recording features to simplify interfacing to both analog and digital recorders. Any circuit can be routed to a recorder port by execution of software code loaded into the switching device, for example, via the maintenance software and host computer 80.

The switching device shown in the drawings also provides digital recording ports. In these embodiments of the invention, the combination of station recording ports and built-in recording ports can provide adequate recording channels. In other embodiments of the invention, additional ports can be added with a dedicated recording line interface unit.

In other examples of the invention, optional digital recording can be provided through a dedicated E1 port E1REC that would require the addition of an E1 mezzanine board to the switching device as shown in FIG. 5.

In some embodiments of the present invention, an optional stand-alone operator position station can be provided remote from the switching device with operating power to the remote operator position station provided via connection to the switching device or a suitable external power source connected directly to the remote operator position station (for example via "28 VDC" as shown in FIG. 4), and voice data connection from the switching device to the remote operator position station.

In the embodiment of the invention shown in the drawings, a suitable connector on the optional remote operator position station and an RJ-45 port (from line interface unit ISDN-U in FIG. 5) provide the interface connection between the switching device and an optional remote operator position station so that voice data can be supplied from the switching device to the touch display screen 12a' at remote operator position station.

In the embodiment of the invention shown in the drawings, a suitable interface cable 13, for example, an ISDN two wire loop, is provided between the central control unit (lower row of connectors—ISDN-U LIU1 in FIG. 5) and the operator position station touch display screen (upper row connector ISDN in FIG. 3) to transmit voice data relay to the local operator position station touch display screen 12a in the switching device. In alternative examples of the invention this interface connection is made internally to portable switching enclosure 12.

The connector identified as AUX DATA in FIG. 3 provides the interface connection between the switching device and a remote auxiliary device such as a computer terminal utilizing RS-232 communications for switching device software and/or firmware debugging.

The connector identified as AUX RECORDER in FIG. 3 provides the interface connection between the switching device's local operator position station with touch display screen 12a and a remote auxiliary recorder.

The connector identified as SPEAKER/MIC in FIG. 3 provides the interface connection between the switching device's internal operator position station with touch display screen 12a and an external speaker and/or microphone.

In one embodiment of the invention, prior to powering up the switching device for normal operation, external power is connected to the switching device and power ON/OFF switch 22a (FIG. 3 and FIG. 5) is turned on. Any communications radios or subsystems external to the switching device and connected to the switching device 10 are energized. When the switching device is powered up in normal operation, the switching device will automatically configure itself to its most recent settings. Interfaces, interconnected nodes, trunk links, and the entire operational network can go through background diagnostics before initializing and will not be placed into service without passing these diagnostic checks.

In one embodiment of the invention, when the switching device is initialized for the first time, the operator of the switching device performs the step of downloading node controller software, line interface unit software and database information (also referred to collectively as the switching device operating software) as needed for a particular application from the maintenance software and host computer 80.

Figure 11:
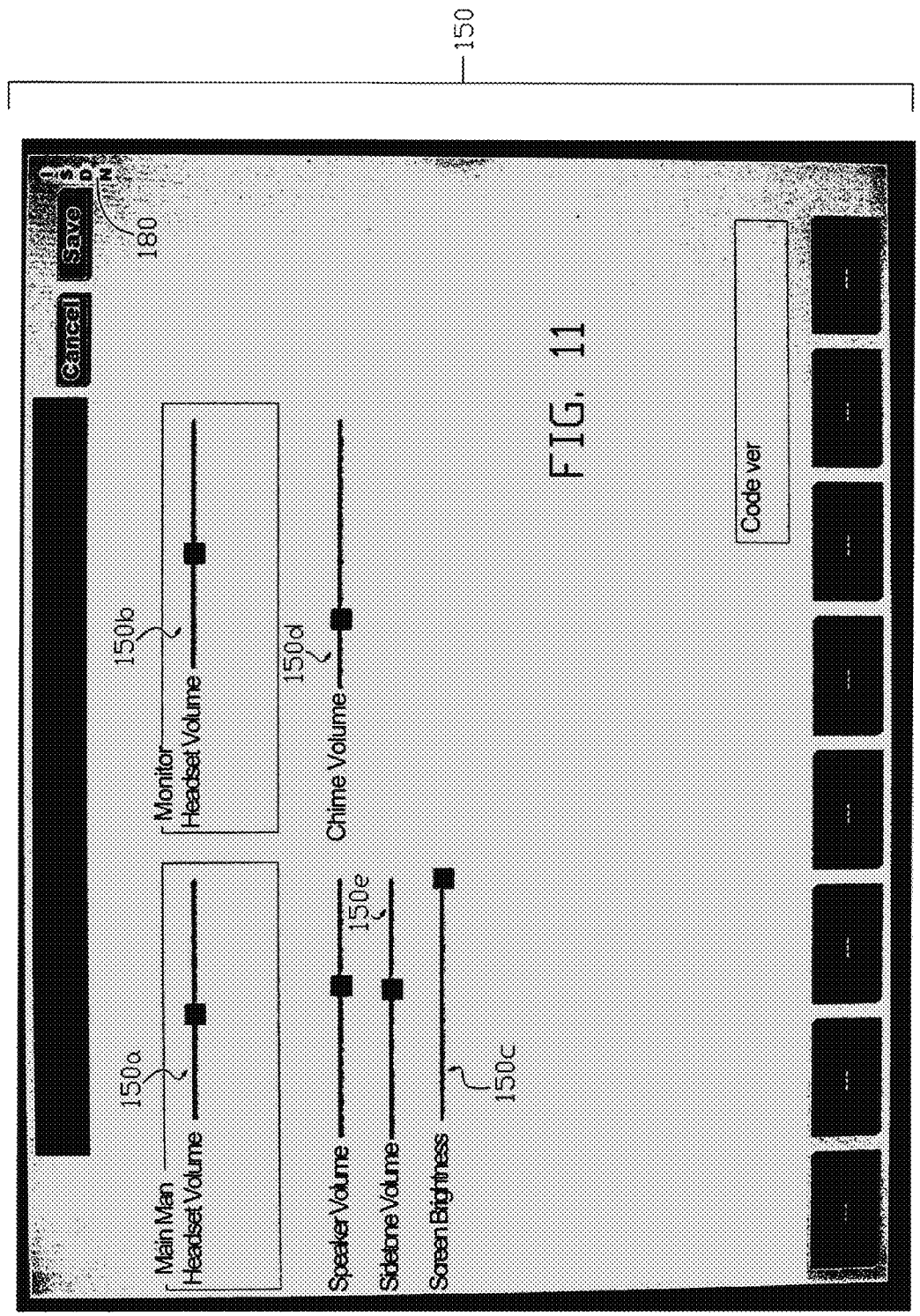
FIG. 11 is one example of a configuration display page that can be displayed on a touch display screen of a portable voice communications digital switching device of the present invention.

In the examples of the invention shown in the drawings, a system configuration that has been delivered with a database loaded to the switching device will self-synchronize itself. The line interface units' visual indicator groups (20a, 20b and 20c) on the front of the switching device as shown in FIG. 1 will indicate all normal port connections (for example via green lit LEDs); and the switching device's operator position station's touch display screen 12a will visually indicate a valid ISDN connection to the central control unit (for example via a vertical green display ISDN indicator bar 180) in FIG. 2 which is a typical start-up screen display. Vertical green display ISDN indicator bar 180 is also seen in the main operations display page 120' in FIG. 20. Touch selecting the "Config" screen button (in the lower left hand corner of the screen display in FIG. 2) will display a configuration display page 150, for example, as shown in FIG. 11 to allow slider bar touch display screen adjustments of the volume and screen brightness parameters shown in FIG. 11. In other examples of the invention, the configuration display page provides a means for adjustment of any variable switching device parameter.

In the examples of the invention shown in the drawings, powering down the voice communications system comprises: turning off and/or disconnecting from its power source any communications equipment external to the switching device, and as desired: turning off the switching device by switching the device's ON/OFF switch 22a to the OFF position; and disconnecting the device's power cable from the switching device if power is externally supplied.

In the examples of the invention shown in the drawings, the switching device has suitable visual indicators, for example the three LED group 20d on the front panel as shown in FIG. 1 that illuminate when a corresponding function is active. Table 2 illustrates one example of the node controller's visual indicators. The node controller indicator LED group 20d will light up if power is on. The LED indicators for the node controller are identified as Maintenance Work Station (MWS), Local Area Network (LAN) and Status (ST). In one embodiment of the invention each indicator can appear in various colors as indicated in Table 2.

TABLE 2

| LED | | FUNCTION | GREEN | YELLOW | RED | OFF |
|---|---|---|---|---|---|---|
| LED | LAN | Ethernet | Solid: Link active Flashing: Receiving data from MWS | Link connected | n/a | Link not present |
| | MWS | Serial port to MWS 80 | Solid: Link active Flashing: Receiving data from MWS | not applicable (n/a) | n/a | Link not present |
| | ST | Status | Solid: Online | Solid: Booting Fast flashing: Receiving node controller program from MWS or a redundant node controller | n/a | Offline no power |
| LCD (located on the touch display screen 12a | ISDN Connectivity Status | Connected: Ready to communicate | n/a | No Signal | n/a | |

LEDs in node controller indicator LED group 20d that are visible on the front panel of the switching device in the embodiment of the invention shown in drawings are:
LAN which indicates the status of the Ethernet port and whether it is connected to maintenance software and host computer 80;
MWS which indicates the status of the connection to a maintenance software and host computer; and
ST which indicates the operational status of the switching device's central control unit.

Figure 2:
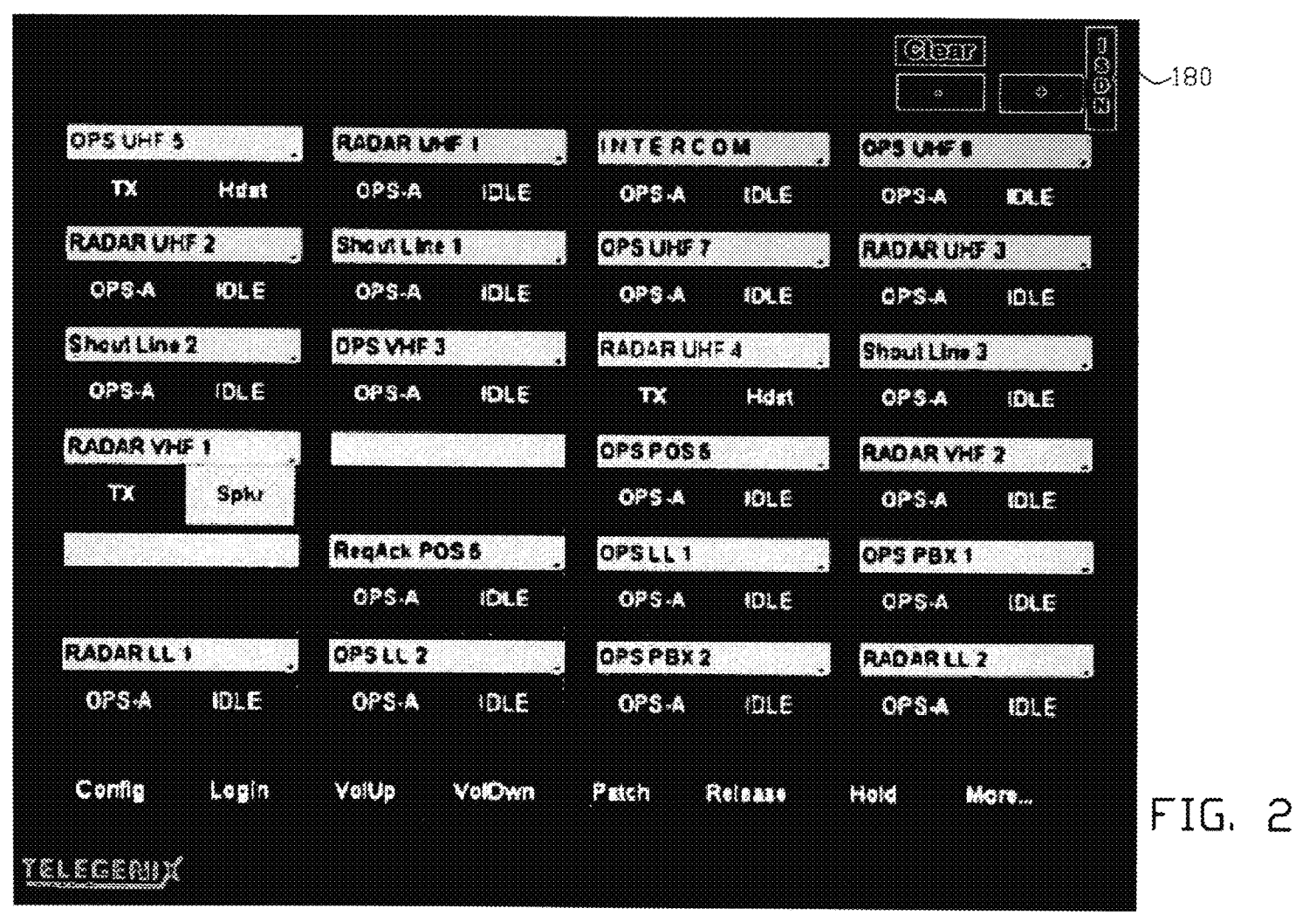

In one embodiment of the invention, the switching device has a visual indicator on touch display screen 12a that indicates when the touch display screen is ready for use. The Link Status ISDN indicator bar 180 appears in the top right corner of touch display screen 12a in one embodiment of the present invention as shown for example in FIG. 6(a). It initially appears as a red vertical bar at startup and changes to a green vertical bar that can include the letters ISDN as shown in FIG. 2. Vertical ISDN indicator bar 180 is illustrated in FIG. 2 which is a typical start-up screen display of a main operations display page and also illustrated in the alternative main operations display page in FIG. 20.

In the embodiment of the invention shown in the figures, the switching device can support up to three line interface units (two for devices external to the switching device and one dedicated to an internal ISDN board that provides power and data to touch display screen 12a). Each of the three line interface units also has LED indicator groups (20a, 20b and 20c) on the front of the switching device as shown in FIG. 1. The line interface unit's indicators light up to indicate the status of their corresponding communication ports as identified in Table 3 for one embodiment of the present invention.

TABLE 3

| LED | Function | Green | Yellow | Red | Off |
|---|---|---|---|---|---|
| 1 2 3 4 | External devices, ports 1-4 | Device action | Device connected | n/a | Port not configured OR No device attached |
| ST | Status | Online | Solid: Booting Flashing: Receiving LIU program | Flashing: Not communicating with (Node Controller) NC | Offline |

The "1" indicator light for each line interface unit illuminates when a voice communication device, that is, a communications radio is plugged into the first port on a specific line interface unit connector board. The indicator lights labeled 2, 3, and 4 do the same for the second, third, and fourth ports, respectively. The fifth indicator is labeled "ST" and indicates the communications status of the line interface unit's circuit board.

Node controller 32b provides the node reference clocks, central node processing, memory, and centralized call processing for the node. Node controller 32b generates the reference timing clocks used internally by the node. In some embodiment of the invention reference timing works in three software-controlled modes:

INTERNAL MODE that is used for freestanding single node operations, that is, portable voice communications switching device 10.

EXTERNAL MODE that is used when a node receives its clock from a suitable external timing standard; and LOOP MODE that is used when clock timing and synchronization for a particular communications system installation comes from a foreign network outside of the communications system connected to the switching device or another node via recovered clocks.

An operator of portable voice communications switching device 10 of the present invention can select from multiple device display pages on internal touch display screen 12a or a remote optional touch display screen 12a' if used in a particular application. Each display page presents functional information about portable voice communications switching device 10 to the operator and provides a means for operator input to the switching device, for example, by displayed input selector buttons or sliders. In the embodiment of the invention shown in the drawings, the multiple device display pages comprise: main operations display page 120; dial display page 130; (3) login display page 140 and (4) configuration display page 150.

One embodiment of main operations display page 120 is shown in FIG. 6(a). In the present invention the main operations display page provides a means for an operator's interface of controls and facilitates telephone communications and various radio band communications (for example, UHF and VHF radio) in a communications system controlled via the portable switching device with pre-programmed circuit selectors. In this embodiment of the invention, the general appearance of the main operations display page (such as text and selected element colors, fonts and font size) is controlled by the device maintenance software installed in the maintenance software and host computer 80 that can be connected to portable switching device 10 as described herein for transfer of the device maintenance software to the switching device.

In the embodiment of the invention shown in the drawings, the upper left corner of main operations display page 120 can displays an optional large-digit clock display in the box designated OPTIONAL CLOCK in FIG. 6(*a*) or other suitable location on the display screen with optional function provided by operator touch input to hid the clock display.

In the embodiment of the invention shown in the drawings, the box designated TEXT MESSAGE LINE in FIG. 6(*a*) is the text message area of main operations display page 120 and is located at the top center of the touch display screen. The text message line provides a means for display of switching device commands or communications system commands, prompts and text messages.

Figure 7:
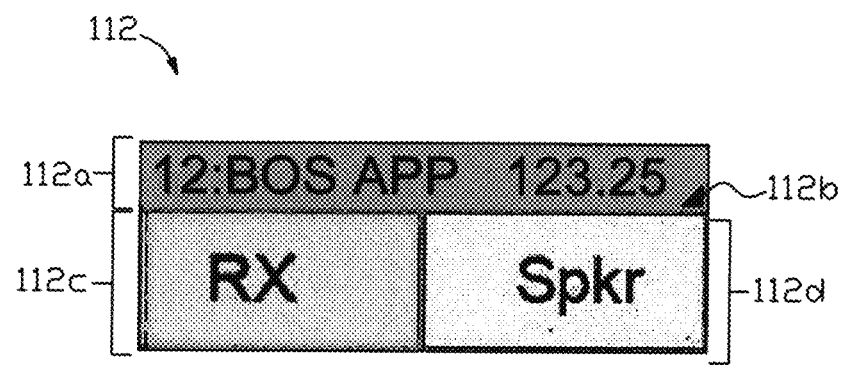
FIG. 7 is one example of a typical circuit selector display that can be displayed on the main operations display page shown in FIG. 6(a).

A plurality of communications circuit selectors are designated by the region CIRCUIT SELECTORS on main operations display page 120, for example, as shown in FIG. 6(*a*). Each communications circuit selector in this embodiment of the invention, for example, circuit selector 112 in FIG. 7 has four parts: circuit caption 112*a* ("12: BOS APP 123.25" for this example); volume icon indication 112*b* (triangular icon in this example); left key 112*c* (screen touch button RX in this example); and right key 112*d* (screen touch button Spkr in this example) as further described herein, that can be configured by an operator of the switching device. For example caption lettering and/or wording can be individually configured by the operator.

In addition to overall volume adjustments further described herein at a touch display screen, the operator can individually adjust the volume on each communications circuit via touch movement of the triangular volume indicator 112*b* for each circuit to allow the operator to balance volume on the various circuits relative to other circuits. For adjustment of an individual communications circuit volume, the operator can touch select the volume up (VolUp) or volume down (VolDwn) function button (illustrated at the bottom of the main operations display page in FIG. 2 and then touch select the circuit selector that should be adjusted, for example "12: BOS APP 123.25" in FIG. 7 on the main operations display page 120. Touch selecting the VolUp or VolDwn button again and the triangular volume indicator at the right of a circuit selector's circuit caption area becomes larger or smaller as the individual communications circuit volume is increased or decreased.

The left key of the circuit button 112*c* (displaying "RX" in FIG. 7) can be touch selected by the operator to establish or disconnect a telephone call or other voice communications connection controlled by portable switching device 10. In general the left key of a circuit button can have lettering and a button color that conveys the state of the communications circuit. Depending on the communications circuit type that is configured, there can be a different number of states and the button lettering and coloring can change dynamically as the state changes as specified in algorithms executed by the portable switching device's system software. For example, when a communications circuit changes to a "TX Ringing" state, the TX button for the circuit can change lettering, button color, font and font color for that state to provide a visual recognition of the change in state.

The right key of the circuit button 112*d* (displaying "Spkr" in FIG. 7) can be touch selected to toggle an incoming audio communication between a headset and a speaker. In this embodiment of the invention, the RX circuit button 112*c* can have four states, namely: Headset, Speaker, Idle and Null. The lettering, font, font color, and font size can be configured in a way similar to the TX button.

Preferably all configuration changes to lettering, font, font color and font size representing changes to circuit states are consistent for all "RX" (receive) and all "TX" (transmit) states for all circuits to present a consistent state visual recognition pattern to the operator of the switching device.

For any active communications circuit, the operator can switch between listening to the audio communication over a speaker or a headset/handset. To switch between the headset/handset and speaker the operator can touch select the right key button in the displayed circuit selector for the specific communications circuit. If the communications circuit is not active, the headset/handset or speaker option will not be available.

Figure 8:
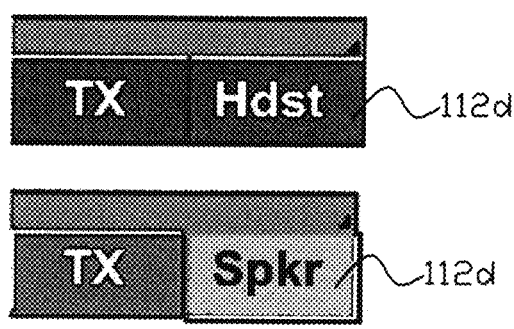
FIG. 8 is one example of left and right key screen touch buttons for headset/handset mode versus speaker mode for a selected circuit on the main operations display page shown in FIG. 6(a).

In the embodiment of the invention shown in the drawings, when the communications circuit is in the headset/handset mode, the default letters on the right key 112*d* button are "Hdst" and the default background color can be dark green, and when the communications circuit is in speaker mode, the default letters on the right key button are Spkr and the default background color can be light green as shown in FIG. 8 where dark green is represented by a darker shade of gray than that for light green.

In the embodiment of the invention shown in the drawings, function buttons are located at the bottom of the main operations display page as designated by "FUNCTION BUTTONS" in FIG. 6(*a*). In FIG. 6(*b*) two alternatively displayed rows of eight function buttons 120*a* and 120*b* are shown where the function button "More . . . " at the right end of a displayed row of function buttons can be touch selected to view an alternative row of function buttons. Function button color, font and font color of each function button can be configured in a similar manner as for left and right key circuit selector buttons.

Link status rectangular icon as designated by "LINK STATUS" in FIG. 6(*a*) can also be referred to as an ISDN indicator bar 180 in this embodiment of the invention. The ISDN indicator bar indicates the status of the integral operator position station and its connection to the IDSN line interface unit 32*c*'. A green ISDN bar indicator can be used to indicate a good connection and a flashing red indicator can indicate that a connection is not yet established or has stopped functioning.

Clear button rectangular icon designated "CLEAR BUTTON" on the main operations display page in FIG. 6(*a*) can be used by the operator to touch select clearing the text message line.

The page number display as designated by "PAGE NUMBER" in FIG. 6(*a*) can be automatically displayed by the switching device operating software. If there is only one main operations display page, the page turner touch buttons on either side of the page number display icon will not display. When there are more communication circuits programmed for use by the switching device operating software than can be displayed on a single main operations display page, it is necessary to turn or flip display pages to view and use all of the available communications circuits. By touch selecting either of the page turner buttons, additional communications circuit selectors are displayed. In this embodiment of the invention, either page turner button flashes when there is a communications circuit ringing on a main operations display page not currently being displayed. The page turner button that is flashing indicates in which direction the page with the circuit flashing is located (that is, if the left page turner is flashing, it indicates the circuit flashing is on one of the previous pages, and if the right page turner is flashing, it indicates the circuit is on one of the next pages).

Figure 9:
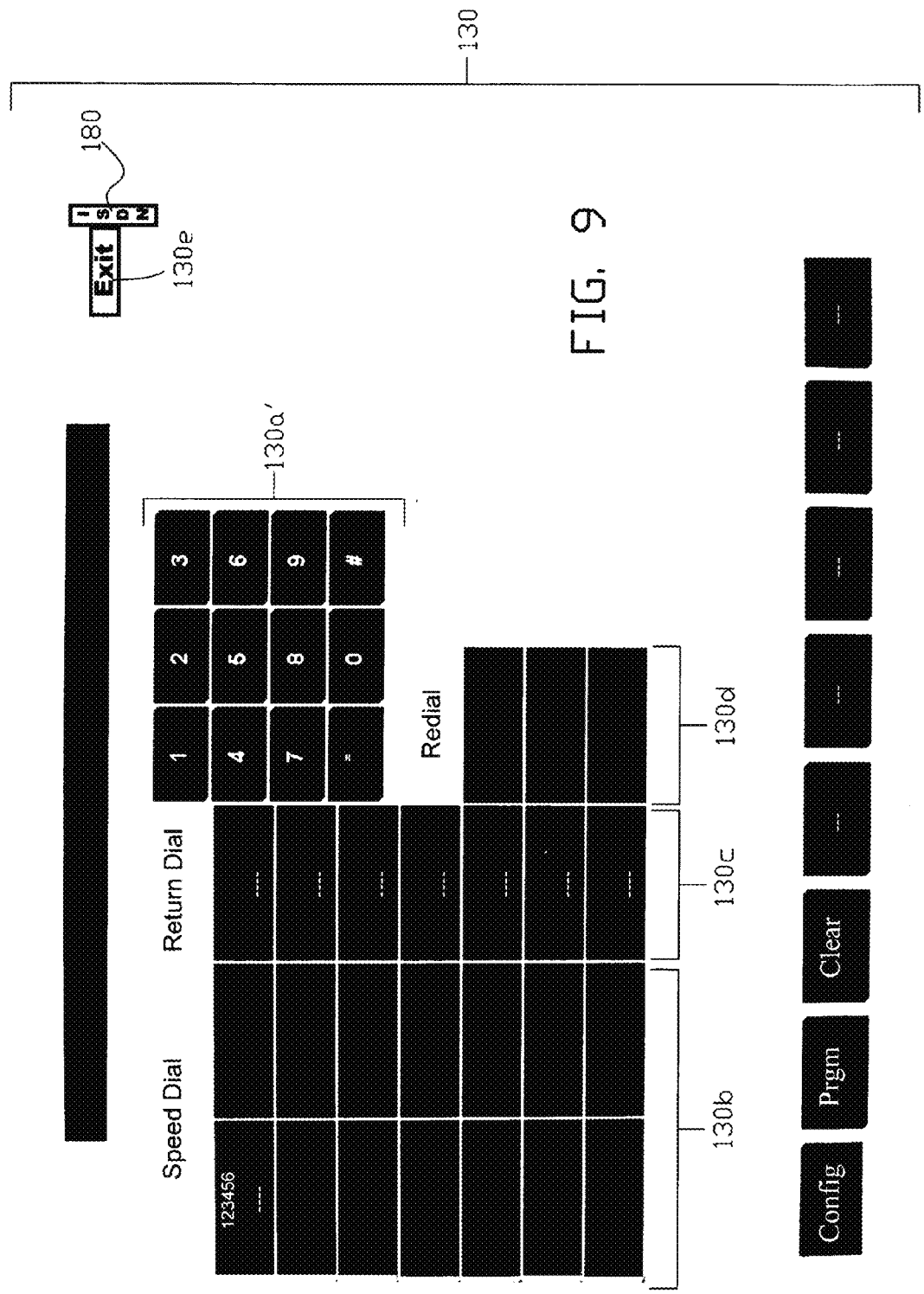
FIG. 9 is one example of a dial display page that can be displayed on a touch display screen of a portable voice communications digital switching device of the present invention.

In this embodiment of the invention, portable switching device's telephone (landline) operation can be used to make and receive telephone calls. All telephones connected into a communications system by portable switching device 10 can operate as hot microphones and do not require PTT. One example of a dial display page 130 is illustrated in FIG. 9 as the access point for the telephone features of a switching device of the present invention.

Figure 10:
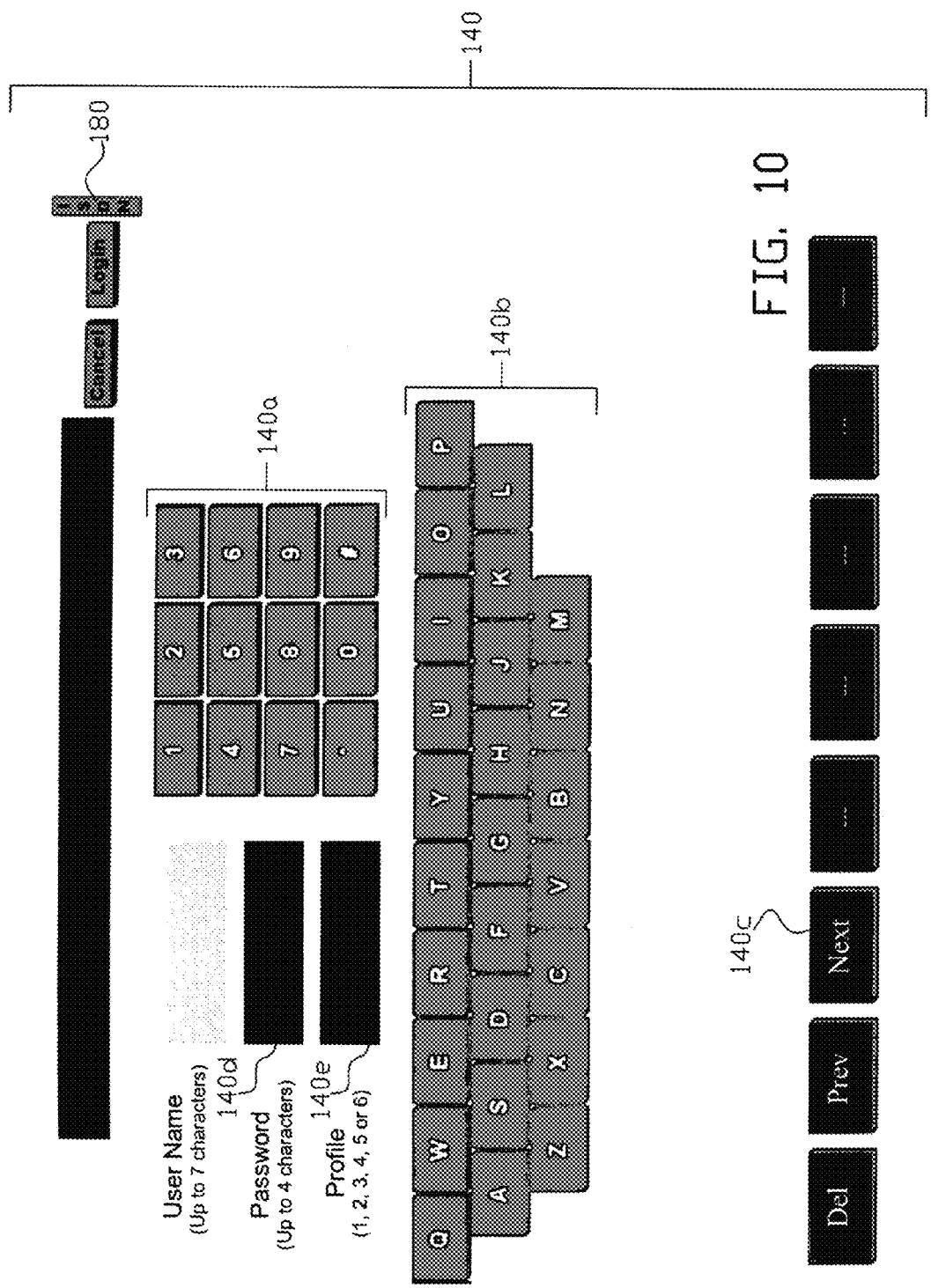
FIG. 10 is one example of a login display page that can be displayed on a touch display screen of a portable voice communications digital switching device of the present invention.

When portable voice communications switching device 10 is powered up, touch display screen 12a displays the default configuration of circuit selectors and function buttons, including the "Login" function button as shown in the example of a main operations page display in FIG. 2 or FIG. 6(a) and FIG. 6(b). The maintenance software in external maintenance software and host computer 80 can store individual configurations and circuit assignments for specific operators and for specific functions of the operator position station. Operators can use the Login function button (FIG. 2) to display the login display page 140 as shown in FIG. 10 for one example of the invention. An operator identification (ID), password and profiles can be configured using the maintenance software.

In this embodiment of the invention shown in the drawings, log-in is accomplished by performing the following steps:

the operator touch selects the Login function button on the default main operations display page (FIG. 2) to open the login display page 140 illustrated in FIG. 10;

the operator enters the alphanumeric operator user name with the displayed numerical keypad 140a and the alphabetic keyboard 140b;

the operator touch selects the "Next" function button 140c or touch selects password field 140d;

if password field 140d is selected, the operator enters the alphanumeric password;

the operator touch selects the "Next" function button or touch selects profile field 140e;

if the profile field 140e is selected, the operator enters a profile number (or other coding character); and the operator touch selects the "Login" button (at the top right corner in FIG. 10) to complete the login process.

In this embodiment of the invention, to logout of portable switching device 10, the operator touch selects the "Logout" button on the main operations display page (FIG. 6(a)) where the "Login" button is replaced with a "Logout" button after the operator is logged in by the switching device operating software. Responsive to a log-out action, touch display screen 12a automatically reverts to the default configuration shown in FIG. 2 by execution of the switching device operating software. After logging back in, an operator can select among one or more main operations display pages that display information on the current operating status or settings of communications circuits connected to the portable switching device.

One example of a configuration display page 150 is illustrated in FIG. 11 and can be used to set headset/handset/speaker volume and screen brightness. If one or more optional remote operator position stations are in use, the configuration display page settings control each individual operator position station's touch display screen independent of the touch display screen at the other operator position stations.

In one embodiment of the invention, to access configuration display page 150 the operator touch selects the "Config" function button on the main operations display page (FIG. 2 or FIG. 6(a) and FIG. 6(b)). Adjustments are made to individual settings using the display slider bars shown in FIG. 11. Volume adjustments for individual communication circuits can be made on main operations display page 110 using the "VolUp" and "VolDwn" buttons as further described herein.

There are two headset volume adjustment slider bars 150a and 150b shown in configuration display page 150 in FIG. 11. If portable voice communications switching device 10 is used with only one headset connected through a jack box headset connector labeled Operator, slider bar 150a labeled "Main Man" is used. If the switching device is used with two headsets, the second headset volume adjustment is done using slider bar 150b labeled "Monitor".

In some embodiments of the invention, touch display screen 12a is illuminated with backlighting to help make each displayed page clearly visible. The brightness of this back lighting can be adjustable. Brightness can be adjusted with the screen brightness slider bar 150c in FIG. 11 to control the level of backlighting relative to the ambient light around the switching device.

Chime Volume slider bar 150d in FIG. 11 can be provided to adjust the sound heard when there is an incoming call on a telephone communications circuit connected to the switching device.

Radio communications control is accomplished by selecting and deselecting radio circuits. Radio circuits are selected either for monitoring (RX), or for transmitting/monitoring (TX), or are deselected. The left and right circuit selector buttons are used to select a radio circuit and to route its audio activity. The buttons display circuit status by using text, colors, and flashing as illustrated for example in Table 4 for one embodiment of the present invention.

TABLE 4

| BUTTON | COLOR | TEXT | EXPLANATION |
|---|---|---|---|
| Caption | Grey | Circuit information | The circuit ID number and name appear in the circuit selector caption. If the button is not assigned, the caption is blank. It will always appear with black text and a grey background. |
| Left and Right keys | Grey | Idle | The assigned circuit is ready, but not selected by the operator (if one or more optional remote touch display screens are in use, they will all indicate that this specific circuit is not selected by any operator). |
| Left and Right keys | Tan | Active | This indicates the circuit is selected by an optional stand-alone remote touch display screen device. The button may flash when there is audio activity. |
| Left key | Green | RX . . . | The audio is routed to headset/handset/speaker. The operator has set the switching device to receive only audio on this circuit. |
| | Green | TX . . . | The operator has selected to both receive and transmit on this circuit. The audio is routed to an output device. |
| | Light Blue | Trying | One operator position station is ringing another operator position station. |
| | Light Blue | Route | Another operator position station is dialing on the same communication circuit. |
| | Green or yellow | Hold | The communication circuit is in a "Hold" state. |

TABLE 4-continued

| BUTTON | COLOR | TEXT | EXPLANATION |
|---|---|---|---|
| Right | Green | Hdst/Spkr | The monitored audio destination is either headset or speaker. |

The colors and lettering examples used in the above example for the circuit selectors can be default settings that the operator can change. Radio operation information, conveyed through the circuit selector buttons, is designed to impart information depending on how many operator position stations with touch display screens are in use. Certain button text information in the above table is not needed when the portable voice communications switching device 10 of the present invention is not used with one or more optional, stand-alone remote touch display screen devices.

Radio operations in one embodiment of the invention comprise:
  radio transmission modes;
  circuit selector button indications;
  radio override operation;
  sidetone;
  hot key radio circuits; and
  secure radio transmission.

Transmitting on a radio requires a specific transmit or PTT signal. There are three radio transmission modes that the switching device operating software can program for each circuit:
  PTT lockout;
  PTT prioritization; and
  talk-down.

When a communications circuit is connected to the portable switching device is in PTT lockout mode, only one operator can transmit. The operator that keys the radio first, is able to transmit, while locking out other operators at different operator position stations. Additional PTT attempts, when in PTT lockout mode, are denied and the operator attempting to transmit receives an audible warning beep and a visual warning in the "TEXT MESSAGE LINE" illustrated in the main operations display page shown in FIG. 6(*a*).

When a communications circuit is part of a transmit priority hierarchy (PTT prioritization) higher ranking operators override a communications circuit if it is being used by lower ranking operators which is a situation that can only occur in an environment where one or more optional stand-alone remote operator position stations with touch display screens 12*a*' are being used. Override of a communications circuit can be indicated to the lower ranking operator by a visual warning in the text message line of the main operations display page.

When a communications circuit is in talk-down mode, any operator, or multiple operators in an environment where one or more optional stand-alone remote operator position stations with touch display screens are being used can transmit on the talk-down communications circuit at any time.

A radio circuit is "Idle" when it is not selected at any operator position station. FIG. 12 illustrates the left and right key default idle circuit selector. In other embodiments of the invention the letters "Idle" can be replaced with a call sign or letter designation used by a communications station, and/or to change the button colors. Non-configured circuit selector buttons contain a dash (that is, no letters). When a radio circuit is selected for monitoring, the operator at the operator position station that selected the radio hears audio through either a headset/handset or speaker.

The following steps are performed by an operator of the portable voice communications switching device 10 of the present invention to select a radio circuit for monitoring and are graphically illustrated in FIG. 13 starting with an "Idle" communications circuit in left and right key buttons display 160*a*:
  the operator touch selects the right key button on the desired radio circuit selector circuit display; the right key button changes color and displays the letters "Spkr"; the left key button changes color and displays the letters "RX" in the left and right key buttons display 160*b*;
  the right key button flashes (indicated by half-shaded right key button display 160*c*) when there is audio activity on the selected circuit, that is, transmission from a radio or another operator position station;
  the operator touch selects the right key button to switch audio between the headset/handset and the speaker and the right key button changes color and displays the letters "Hdst" as shown in left and right key buttons display 160*d*.

When a radio circuit is selected for transmission, the communications circuit is automatically selected for monitoring.

Figure 14:
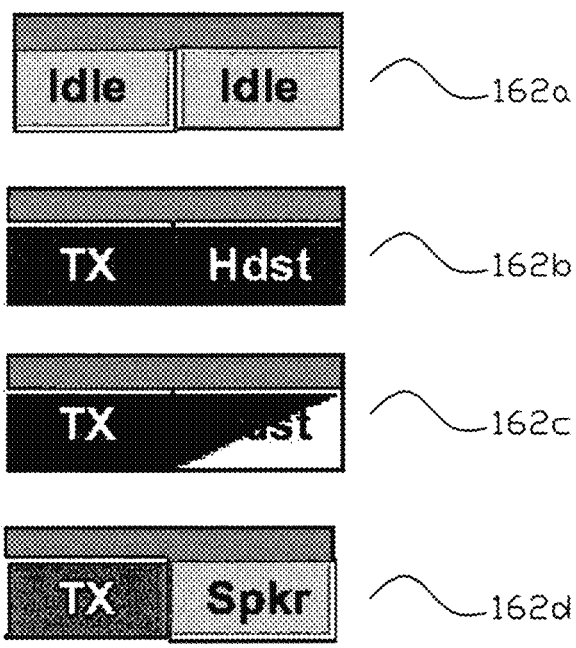
FIG. 14 illustrates steps performed by an operator of a portable voice communications digital switching device of the present invention to select a radio circuit for monitoring and transmission.

The following steps are performed by the operator to select a radio circuit for monitoring and transmission and are graphically illustrated in FIG. 14 starting with an "Idle" communications circuit in left and right key buttons display 162*a*:
  the operator touch selects the left key button on the desired radio circuit selector circuit display to select the circuit for TX (TX selected); the left key button changes color and displays the letters "TX"; the right key button changes color and displays the letters "Hdst" in left and right key buttons display 162*b*; the right key button flashes as shown in left and right key buttons display 162*c* when there is audio activity on the circuit (that is, transmission from a radio or another operator position station); and
  the operator touch selects the right key button to switch audio between the headset/handset and the speaker and the right key button changes color and displays the letters "Spkr" as shown in left and right key buttons display 162*d*.

Figure 15:
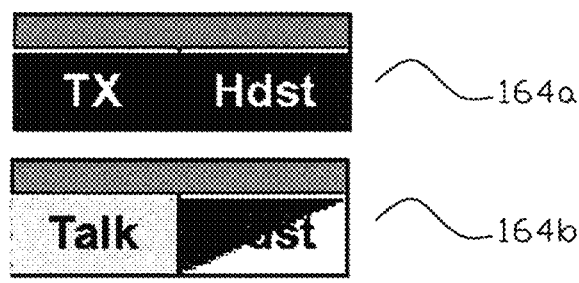
FIG. 15 illustrates steps performed by an operator of a portable voice communications digital switching device of the present invention to transmit on a selected circuit.

The following steps are performed by the operator to transmit on selected circuits and are graphically illustrated in FIG. 15:
  the operator touch selects one or more radio communication circuit(s) for TX as illustrated by the left and right key button display 164*a*;
  pushes the PTT device; and the right key button flashes on all selected radio circuits and the left key button changes color and displays the letters "Talk" as illustrated in left and right key buttons display 164*b*; and
  releases the PTT device to end the transmission.

The following is related to interpreting activity on radio communication circuits when one or more optional stand-alone remote operator position stations with touch display screens 12*a*' are being used.

A radio communication circuit is considered "Active" when it is selected at any operator position station (either integral to portable voice communications switching device 10 or remote from the switching device). Portable voice communications switching device 10 can indicate to an operator through the circuit selector's settings at an operator position station how a radio circuit is being used at another operator position station by changing the left key selector button, whether or not any specific operator position station has the circuit selected for use.

Figure 16:
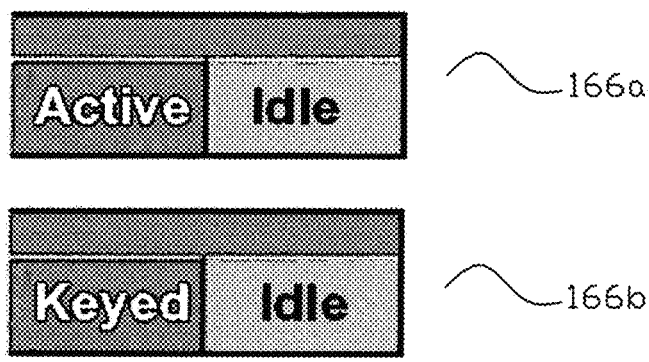
FIG. 16 illustrates the indications in the left and right key buttons at all operator position stations preprogrammed with the same circuit when the circuit is not selected by any individual operator position station.

When any individual operator position station does not have the circuit selected, the indications at all operator position stations preprogrammed with the same circuit are as follows and illustrated in FIG. 16:

the letters "Active" are displayed in the left key button when the radio is being monitored (either TX or RX mode) at another operator position station as illustrated in left and right key button display 166a; and the letters "Keyed" are displayed in the left key button when another operator position station is transmitting on the radio station as illustrated in left and right key button display 166b.

Figure 17:
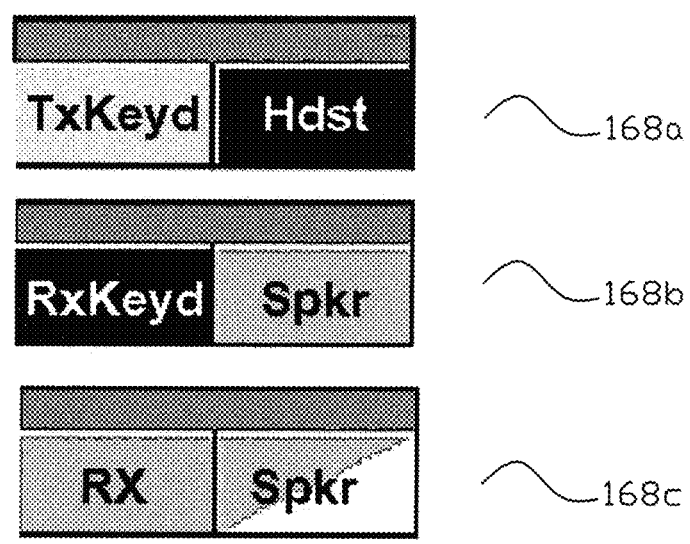
FIG. 17 illustrates the indications in the left and right key buttons at all operator position stations preprogrammed with the same circuit when the circuit is selected by some individual operator position stations.

Occasionally several operators select the same radio circuit with some operators to monitor (RX), and other operators to transmit/monitor (TX). When any individual operator position station does have the circuit selected, the indications at every operator position station preprogrammed with the same circuit are as follows and illustrated in FIG. 17:

the letters "TxKeyd" are displayed when the selected radio is in TX mode as illustrated in left and right key button display 168a;

the letters "RxKeyd" are displayed when the selected radio is in RX mode as illustrated in left and right key button display 168b; and the right key button flashes when there is audio activity on the circuit (that is, transmission from a radio or an operator at another operator position station) as illustrated in left and right key button display 168c.

A deselected radio circuit cannot be monitored or used for transmission.

Figure 18:
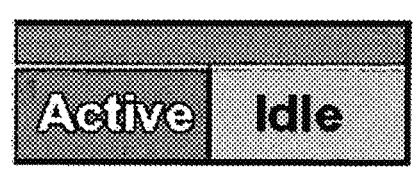
FIG. 18 illustrates the indications in the left and right key buttons when an operator deselects a radio circuit.

The following step is performed by the operator to deselect a radio circuit and is illustrated in FIG. 18. The operator touch selects the left key button on the desired circuit with one touch select if the circuit is in TX mode or two touches select if the circuit is in RX mode; the left key button displays either the letters "Idle" or "Active". Idle indicates there are no communications systems users on the circuit. Active indicates that one or more operator position stations have the circuit selected.

The radio override operation function creates a transmit prioritization hierarchy. An operator with higher transmit priority can override the transmission of another operator with lower transmit priority.

The following step is performed by an operator to select radio override. The operator touch selects the "R Ovrd" function button (when the second row 120b of function buttons in FIG. 6(b) are displayed) and transmits on the desired radio circuit; operators lower in the transmit prioritization hierarchy temporarily lose transmission capability; operators higher in the transmit prioritization hierarchy can touch select the "R Ovrd" function button to override the transmission of another operator with lower transmit priority.

To deselect transmission override an operator touch selects the "R Ovrd" function button.

Sidetone is an aural cue for an operator who is talking (also referred to as the talker). A low-volume audio signal is heard in the talker's headset/handset. Sidetone is only heard during radio transmission. The sidetone volume slider bar 150e on configuration display page 150 (FIG. 11) allows the operator to set the desired sidetone level. Sidetone stops when the selected radio is unkeyed.

The maintenance software and host computer can be used to program specific radio circuits as hot keys, thus preventing transmission on multiple circuits at the same time. While touch selecting a hot key radio circuit right key selector button, the hot key radio circuit will key (that is, initiate a PTT for the radio) for this circuit only and lock-out the PTT for the other radio circuits at this operator position station. All other circuits at this operator position switch to monitor mode during a hot key transmission.

In some embodiments of the invention, security level of circuits can be coded for display on touch display screen 12a. For example, secure circuits can be coded in red color display; mixed secure/non-secure circuits can be coded in red and black color display; and non-secure plain circuits can be coded in black color display. Alternatively suitable icons can be provided in the circuit caption to indicate a security level, such as a lock icon, to indicate a secure circuit.

The telephone capabilities of portable voice communications switching device 10 are as follows:

accept incoming landline telephone calls;

initiate outgoing landline telephone calls;

program a communications circuit so it is dedicated to dialing one landline number;

create conference calls between landline circuits and other voice communications circuits (for example radio or interphone);

create voice networks (nets); and create indirect access telephone circuits.

Figure 19:
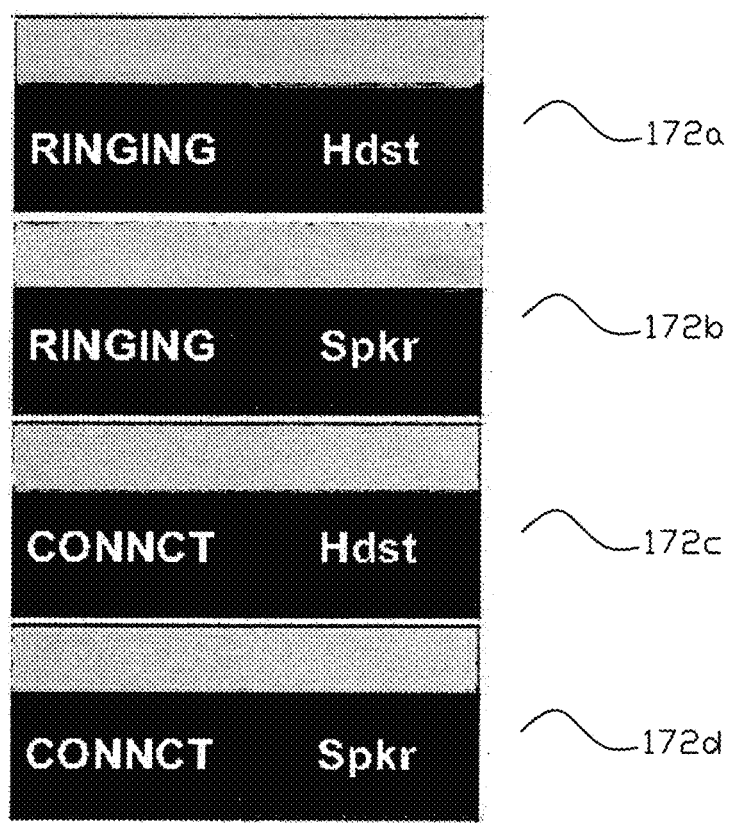
FIG. 19 illustrates the indications in the left and right key buttons when an operator answers an incoming landline call.

The telephone (landline) operation is used to make and receive telephone calls. All switching device's telephone communications circuits operate as hot microphones and do not require PTT. Dial display page 140 as shown in FIG. 10 for one example of the present invention is the access point for the available telephone features. When there is an incoming landline call on a communications circuit the following steps are processed by the switching device operating software as illustrated in FIG. 19:

in step 172a the left key button on the circuit selector for the incoming landline call flashes the letters "RINGING" and the right key button displays the letters "Hdst" or "Spkr" (step 172b) (the speaker mode is disabled for incoming and outgoing landline calls);

the text message line on a main operations display page displays the identification (ID) of the incoming call;

a ring chime sounds; and the operator utilizes the page turner buttons on main operations display page 120 in FIG. 6(a) to access the main operations page containing the circuit with the incoming call.

To answer the incoming landline call the operator performs the following steps as illustrated in FIG. 19:

touch selects the flashing left key button (displayed "RINGING" in step 172a or 172b);

the left key button changes to display the letters "CONNCT" in step 172c or 172d; and the right key button displays the letters "Hdst" (in step 172c) or "Spkr" (in step 172d) (the speaker mode is disabled for incoming and outgoing landline calls).

Figure 20:
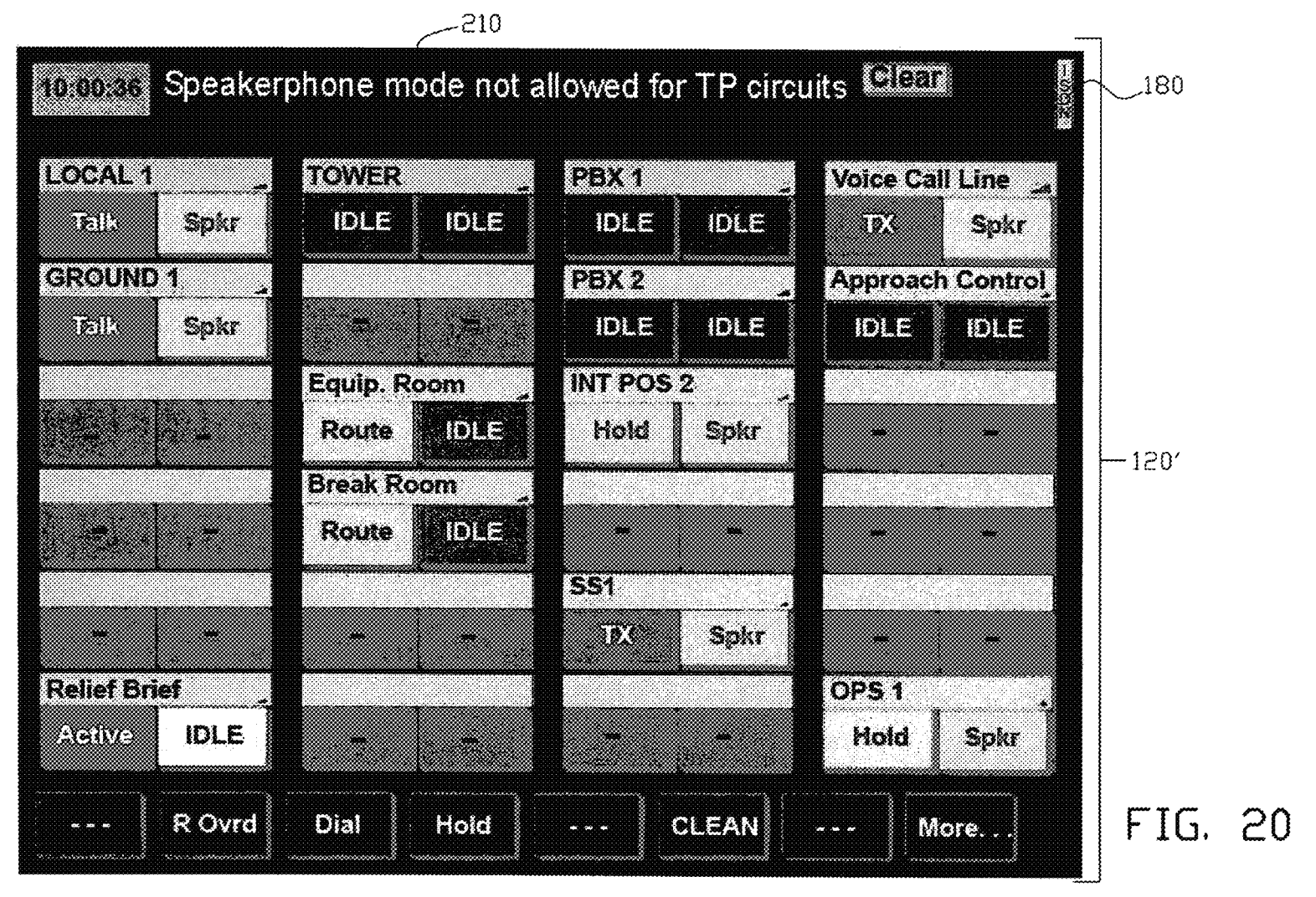

Attempting to switch from "Hdst" to "Spkr" causes a message 210 to appear in the text message line as illustrated by the main operations display page 120' in FIG. 20 on which the incoming landline circuit selector is located. The operator can touch select the "Clear" button next to the text message line to remove the message 210 from the text message line.

Figure 21:
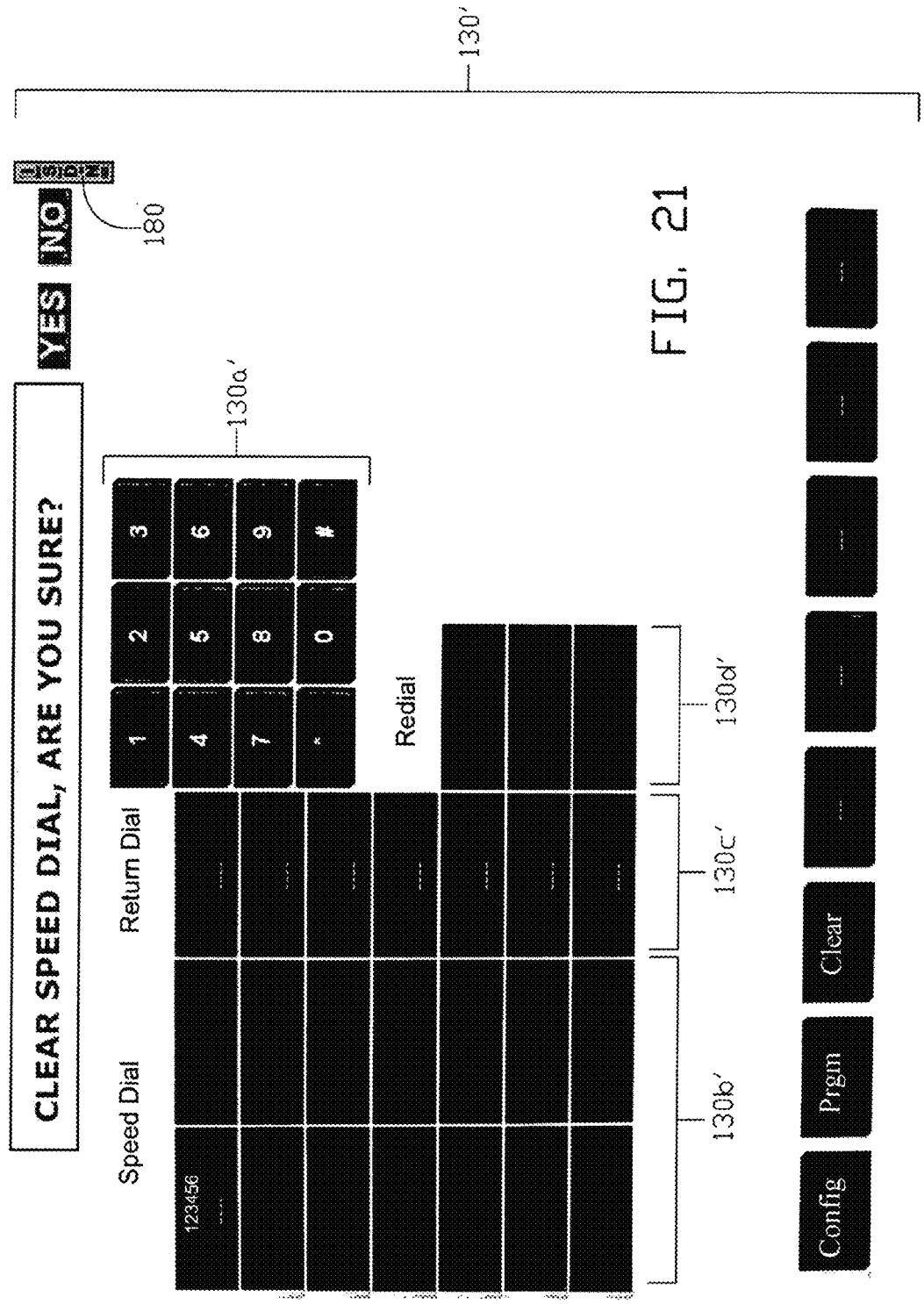
FIG. 21 is another example of a dial display page that can be displayed on a touch display screen of a portable voice communications digital switching device of the present invention.

The following steps are performed by the operator of the switching device to place an outgoing landline call using a dial display page 130' in FIG. 21:

verify that the desired telephone circuit is not in use;

touch selects either the left or right key button of the desired telephone circuit or touch selects the "Dial" function button (when the second row 120b of function buttons in FIG. 6(b) are displayed) on a main operations display screen page and then touch select the desired telephone circuit so that the switching device operating software will display dial display page 130' in FIG. 21;

dial the number on the keypad 130a' on the dial display page; or touch select the desired number in the Speed Dial 130b', Return Dial 130c', or Redial 130d' panels on dial display page 130'; and touch selects "Exit" button 130e as shown in the alternative dial display page 130 in FIG. 9 after dialing to return to a main operations display page.

Telephone circuits can be programmed using the maintenance software and host computer 80 for automatic direct dialing to a designated destination. Upon selecting an automatic direct dialing circuit, the central control unit 22b will automatically dial a stored number by executing the switching device operating software.

Landline circuits can be joined to each other, to radios, and to interphone circuits. The voice net provides flexible conferencing.

To end a landline call an operator at an operator position station touch selects the left key button on the active telephone circuit selector to return the circuit selector to display "Idle" and "Active" on the left and right key buttons and disconnects the call.

The switching device can combine several devices at any time to conference the users of those devices. Preconfigured conferences are defined as voice nets. Voice nets are available as circuits on a main operations display page and they are always active even if no one is participating. Users can access the voice net (conference) by using the selector button for the selected voice net (conference).

The switching device can be configured for one touch dialing. Speed dial numbers 130b are available on the dial display page 130 as shown in FIG. 9 or FIG. 21. In the embodiment of the invention shown in the drawings there are 14 buttons on the left side of the dial display page in FIG. 9 or FIG. 21 that can be configured for one touch dialing.

The switching device stores the last incoming call numbers of incoming calls to each telephone circuit. To see or dial the stored numbers, the operator accesses the dialing page for the specific telephone circuit by touch selecting that circuit's left or right key selector button. The return dial buttons 130c are in the center of the dial display page 130 in FIG. 9. The numbers of the last incoming calls are displayed in descending order with the most recent incoming call on the top.

In addition to the above voice communications switching and control functions the portable voice communications switching device 10 can provide control for position-to-position operations that require communications between devices interconnected by portable communications switching device 10 and include public address; intercom; voice call (shout line); interphone; and door operation.

A public address (PA) circuit is formed by configuring an intercom circuit as a transmit-only circuit. The PA circuit can be connected to as many speakers as desired, including every speaker at an operator position station and any stand-alone speakers installed in a particular application of the present invention. The operator at an operator position station using the PA circuit must use the PTT.

The intercom operation facilitates voice contact simultaneously with every operator that is configured with the intercom circuit. Intercom circuits are hot microphone (mic) and do not need PTT.

A voice call circuit, commonly known as a shout line, immediately connects any operator position station with any or several other operator position stations. All operator position stations configured for a shout line circuit immediately hear the audio. When an individual operator position station answers the shout line, the shout line circuit immediately changes to "Idle" at all other positions configured for the selected shout line. The shout line operates as a hot mic, which means that PTT is not needed.

The interphone operation has two primary functions, namely initiating and receiving calls between the switching system's operator position stations. Interphone circuits require the operator to dial another operator position station instead of being directly connected (as with an intercom circuit). Interphone circuits do not require the use of external telephone lines. All interphone circuits are hot microphones and do not need PTT.

An intercom circuit controlled by the switching device can be configured to operate a remote device, for example, a door opener for a door to a secure room or space in which portable voice communications switching device 10 is located.

In the description above, for the purposes of explanation, numerous specific requirements and several specific details have been set forth in order to provide a thorough understanding of the example and embodiments. It will be apparent however, to one skilled in the art, that one or more other examples or embodiments may be practiced without some of these specific details. The particular embodiments described are not provided to limit the invention but to illustrate it.

Reference throughout this specification to "one example or embodiment," "an example or embodiment," "one or more examples or embodiments," or "different example or embodiments," for example, means that a particular feature may be included in the practice of the invention. In the description various features are sometimes grouped together in a single example, embodiment, figure, or description thereof for the purpose of streamlining the disclosure and aiding in the understanding of various inventive aspects.

The present invention has been described in terms of preferred examples and embodiments. Equivalents, alternatives and modifications, aside from those expressly stated, are possible and within the scope of the invention. Those skilled in the art, having the benefit of the teachings of this specification, may make modifications thereto without departing from the scope of the invention.

The invention claimed is:

1. A portable voice communications digital switching device for voice communications systems, the portable voice communications digital switching device comprising:
    a portable switching device enclosure;
    a touch display screen on the portable switching device enclosure for displaying a plurality of display page screens to an operator of the portable voice communications digital switching device;
    a central control unit in the portable switching device enclosure, the central control unit having an interface connection with the touch display screen;
    a node controller in the central control unit for receiving a switching device operating software; distributing the switching device operating software to at least a plurality of line interface units in the central control unit; and executing the switching device operating software for a supervisory control of at least the touch display screen and the plurality of line interface units;
    a plurality of communications I/O connectors on the portable switching device enclosure for connecting a plurality of voice communications circuits to the plurality of line interface units; and a plurality of audio I/O connectors on the portable switching device enclosure for connecting to one or more audio devices.

2. The portable voice communications digital switching device of claim 1 wherein at least one remote operator position station having a remote touch display screen is connected to the central control unit for remote control of the plurality of voice communications circuits.

3. The portable voice communications digital switching device of claim 1 wherein each of the plurality of line interface units comprises a universal bus adapter assembly and a mezzanine board attached to the universal bus adaptor assembly to define a voice communication tool for the plurality of voice communications circuits connected to each of the plurality of line interface units.

4. The portable voice communications digital switching device of claim 1 further comprising an external power source connected to the portable voice communications digital switching device to provide power to at least the touch display screen and the central control unit.

5. The portable voice communications digital switching device of claim 1 wherein the plurality of voice communications circuits comprise at least one UHF or VHF radio communications circuit.

6. The portable voice communications digital switching device of claim 5 wherein the plurality of voice communications circuits further comprise at least one telephone landline circuit.

7. The portable voice communications digital switching device of claim 1 wherein the plurality of voice communications circuits comprise at least one telephone landline circuit.

8. The portable voice communications digital switching device of claim 1 further comprising one or more visual indicators located on the portable switching device enclosure for visual status of each of the plurality of line interface units.

9. The portable voice communications digital switching device of claim 1 further comprising one or more visual indicators located on the portable switching device enclosure for visual status of the node controller.

10. A method of displaying on a touch display screen in a portable switching device enclosure of a portable voice communications digital switching device for voice communications systems where the portable voice communications digital switching device further comprises:

a central control unit in the portable switching device enclosure, the central control unit having an interface connection with the touch display screen;

a node controller in the central control unit for receiving a switching device operating software; distributing the switching device operating software to at least a plurality of line interface units in the central control unit; and executing the switching device operating software for a supervisory control of at least the touch display screen and the plurality of line interface units;

a plurality of communications I/O connectors on the portable switching device enclosure for connecting a plurality of voice communications circuits to the plurality of line interface units; and a plurality of audio I/O connectors on the portable switching device enclosure for connecting to one or more audio devices;

the method comprising:

displaying a main operations display page on the touch display screen on start-up of the portable voice communications digital switching device; and selectively displaying a dynamically changing main operations display page for the plurality of voice communications circuits, a dial display page for at least initiating a telephone landline circuit comprising one of the plurality of voice communications circuits, a logon display page for login and logout of an operator of portable voice communications digital switching device, or a configuration display page for an operator input of an adjustment of a variable switching device parameter on the touch display screen by execution of the switching device operating software responsive to the plurality of voice communications circuits connected to the plurality of line interface units and the operator input to the touch display screen.

11. The method of claim 10 further comprising displaying each one of the plurality of voice communications circuits on the dynamically changing main operations display page as a separate circuit selector:

displaying a circuit caption of one of the plurality of voice communications circuits;

displaying a triangular volume icon indicator for touch movement of the triangular volume indicator to adjust the volume of the one of the plurality of voice communications circuits by the operator;

displaying a left key button for touch selection by the operator to at least establish or disconnect the one of the plurality of voice communications circuits; and displaying a right key button for touch selection by the operator to at least toggle the one of the plurality of voice communications circuits between a head set and a speaker.

12. The method of claim 10 further comprising implementing an upper layer data link and network protocols for audio and control processing of the plurality of voice communications circuits connected to one of the plurality of line interface units in a universal bus adaptor of the one of the plurality of line interface units and providing a physical layer interface for the plurality of voice communications circuits connected to the one of the plurality of line interface units in a mezzanine board attached to the universal bus adaptor of the one of the plurality of line interface units.

13. The portable voice communications digital switching device of claim 1 further comprising a maintenance software and host computer located external to the portable switching device enclosure for installing and modifying the switching device operating software received by the node controller.

14. The portable voice communications digital switching device of claim 3 wherein the universal bus adaptor implements an upper layer data link and network protocols for audio and control processing and the mezzanine board provides a physical layer interface for the plurality of voice communications circuits.

15. A portable voice communications digital switching device for voice communications systems, the portable voice communications digital switching device comprising:

a portable switching device enclosure;

a touch display screen on the portable switching device enclosure for displaying a plurality of display page screens to an operator of the portable voice communications digital switching device;

a central control unit in the portable switching device enclosure, the central control unit having an interface connection with the touch display screen;

a node controller in the central control unit for receiving a switching device operating software; distributing the switching device operating software to at least a plurality of line interface units in the central control unit; and executing the switching device operating software for a supervisory control of at least the touch display screen and the plurality of line interface units, each of the plurality of line interface units comprising a universal bus adapter assembly and a mezzanine board attached to the universal bus adaptor assembly;

a plurality of communications I/O connectors on the portable switching device enclosure for connecting a plurality of voice communications circuits comprising at least one radio communications circuit to one of the plurality of line interface units, the mezzanine board of the one of the plurality of line interface units configured to define a voice communication tool for the at least one radio communications circuit to the one of the plurality of line interface units;

a plurality of audio I/O connectors on the portable switching device enclosure for connecting to one or more audio devices; and one or more visual indicators located on the portable switching device enclosure for visual status of each of the plurality of line interface units and the node controller.

16. The portable voice communications digital switching device of claim 15 wherein the universal bus adaptor implements an upper layer data link and network protocols for audio and control processing and the mezzanine board provides a physical layer interface for the plurality of voice communications circuits.

17. The portable voice communications digital switching device of claim 15 wherein the plurality of voice communications circuits further comprise at least one telephone landline circuit.

18. The portable voice communications digital switching device of claim 15 further comprising a plurality of circuit selector displays for each one of the plurality of voice communications circuits on a main operations display page of the plurality of display page screens, each one of the circuit selector displays for one of the plurality of the plurality of voice communications circuits comprising:

a circuit caption for the one of the plurality of voice communications circuits;

a triangular volume icon indicator for touch movement of the triangular volume indicator to adjust the volume of the one of the plurality of voice communications circuits by the operator;

a left key button for touch selection by the operator to at least establish or disconnect the one of the plurality of voice communications circuits; and a right key button for touch selection by the operator to at least toggle the one of the plurality of voice communications circuits between a head set and a speaker.

19. The portable voice communications digital switching device of claim 15 further comprising at least one remote operator position station having a remote touch display screen connected to the central control unit for remote control of the plurality of voice communications circuits.

* * * * *